(12) United States Patent
Tsukagoshi

(10) Patent No.: US 10,862,638 B2
(45) Date of Patent: Dec. 8, 2020

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 183 days.

(21) Appl. No.: 15/184,568

(22) Filed: Jun. 16, 2016

(65) Prior Publication Data

US 2016/0294520 A1 Oct. 6, 2016

Related U.S. Application Data

(62) Division of application No. 14/764,768, filed as application No. PCT/JP2014/056574 on Mar. 12, 2014, now Pat. No. 9,876,616.

(30) Foreign Application Priority Data

Mar. 14, 2013 (JP) ................................. 2013-052559
May 10, 2013 (JP) ................................. 2013-100774

(51) Int. Cl.
*H04N 21/231* (2011.01)
*H04N 21/236* (2011.01)
(Continued)

(52) U.S. Cl.
CPC ............ *H04L 5/0044* (2013.01); *H04H 60/40* (2013.01); *H04L 5/22* (2013.01); *H04L 65/607* (2013.01);
(Continued)

(58) Field of Classification Search
None
See application file for complete search history.

(56) References Cited

U.S. PATENT DOCUMENTS

2004/0174835 A1* 9/2004 Godwin ............ H04N 21/4524
370/316
2004/0181666 A1* 9/2004 Candelore .......... H04N 21/4623
713/160
(Continued)

FOREIGN PATENT DOCUMENTS

JP 2006-129103 A 5/2006
JP 2011-217161 A 10/2011
(Continued)

OTHER PUBLICATIONS

Combined Office Action and Search Report dated Jan. 10, 2018 in Chinese Patent Application No. 201480012887.4 (with English language translation), 16 pages.
(Continued)

*Primary Examiner* — Brian T Pendleton
*Assistant Examiner* — Jean D Saint Cyr
(74) *Attorney, Agent, or Firm* — Oblon, McClelland, Maier & Neustadt, L.L.P.

(57) ABSTRACT

A transmission apparatus including: a transport stream generation unit configured to generate a transport stream in which a first transport packet containing transport media in a payload and a second transport packet containing information about the transport media in a payload, are time-division multiplexed; a transport stream transmission unit configured to transmit the transport stream to a receiver through a predetermined transmission channel; and a time information insertion unit configured to insert time information for allowing the receiver to obtain decoding time and/or presentation time into the first transport packet or the second transport packet.

10 Claims, 44 Drawing Sheets

(51) Int. Cl.
   *H04N 21/2368*   (2011.01)
   *H04N 21/2385*   (2011.01)
   *H04N 21/2389*   (2011.01)
   *H04N 21/65*     (2011.01)
   *H04L 5/00*      (2006.01)
   *H04N 21/242*    (2011.01)
   *H04N 21/43*     (2011.01)
   *H04N 21/845*    (2011.01)
   *H04N 21/8547*   (2011.01)
   *H04L 29/06*     (2006.01)
   *H04H 60/40*     (2008.01)
   *H04N 21/2362*   (2011.01)
   *H04N 21/2365*   (2011.01)
   *H04L 5/22*      (2006.01)

(52) U.S. Cl.
   CPC ..... *H04N 21/2362* (2013.01); *H04N 21/2365* (2013.01); *H04N 21/242* (2013.01); *H04N 21/4307* (2013.01); *H04N 21/8456* (2013.01); *H04N 21/8547* (2013.01)

(56) References Cited

U.S. PATENT DOCUMENTS

| | | | |
|---|---|---|---|
| 2006/0161675 A1* | 7/2006 | Ducharme | H04N 21/23406 709/231 |
| 2007/0183452 A1* | 8/2007 | Hryszko | H04N 7/163 370/474 |
| 2010/0118697 A1* | 5/2010 | Shumate | H04N 21/2402 370/230 |
| 2012/0185907 A1 | 7/2012 | Park et al. | |
| 2012/0293621 A1 | 11/2012 | Tsukagoshi et al. | |
| 2013/0235270 A1* | 9/2013 | Sasaki | H04N 21/44012 348/564 |
| 2015/0172690 A1 | 6/2015 | Tsukagoshi | |
| 2015/0281740 A1 | 10/2015 | Tsukagoshi | |
| 2015/0296248 A1 | 10/2015 | Tsukagoshi | |
| 2015/0373669 A1* | 12/2015 | Lee | H04W 72/005 370/329 |

FOREIGN PATENT DOCUMENTS

| | | |
|---|---|---|
| KR | 10-2013-0009670 A | 1/2013 |
| WO | WO 2012/099429 A2 | 7/2012 |
| WO | WO 2013/021656 A1 | 2/2013 |

OTHER PUBLICATIONS

International Search Report dated Jun. 17, 2014 in PCT/JP2014/056574 (with English language translation).
Korean Office Action dated Dec. 27, 2017 in Patent Application No. 10-2015-7024271 (with English Translation).
Japanese Office Action dated Mar. 7, 2017 in Patent Application No. 2014-186977 (without English Translation).
Office Action dated Aug. 26, 2016 in Korean Patent Application No. 10-2015-7024271 (with English translation).
Extended European Search Report dated Sep. 21, 2016 in Patent Application No. 14762911.7.
"Study of ISO/IEC CD 23008-1 MPEG Media Transport", MPEG-H Systems, ISO/IEC JTC1/SC29/WG11, MPEG/N13089, XP055266106, 2012, 124 Pages.
Korean Office Action dated Feb. 25, 2019 in Korean Patent Application No. 10-2017-7017510 (with English translation), 9 pages.

* cited by examiner

NTP SHORT FORMAT

| INTEGER PART OF SECOND | FRACTIONAL PART OF SECOND |
| 16 bits | 16 bits |

32 bits

IN TWO'S COMPLEMENT. BIG ENDIAN.

TS0 (= 0)

| Time | 0 1 2 3 4 5 6 7 |
| Dec(AU) | 0 1 2 3 4 5 6 7 |
| Display(AU) | 0 2 3 1 5 6 4 |

← EXAMPLE REORDERING

| AU# | DTS(n) | DLT(n) | PTS(n) |
|---|---|---|---|
| 0[I] | 0 | 1 | 1 |
| 1[P] | 1 | 3 | 4 |
| 2[B] | 2 | 0 | 2 |
| 3[B] | 3 | 0 | 3 |
| 4[P] | 4 | 3 | 7 |
| 5[B] | 5 | 0 | 5 |
| 6[B] | 6 | 0 | 6 |

(EXAMPLE WHERE dlt_time/time_tick = 1)

(EXAMPLE WHERE dlt_time/time_tick = 1)

(EXAMPLE WHERE dlt_time/time_tick = 1)

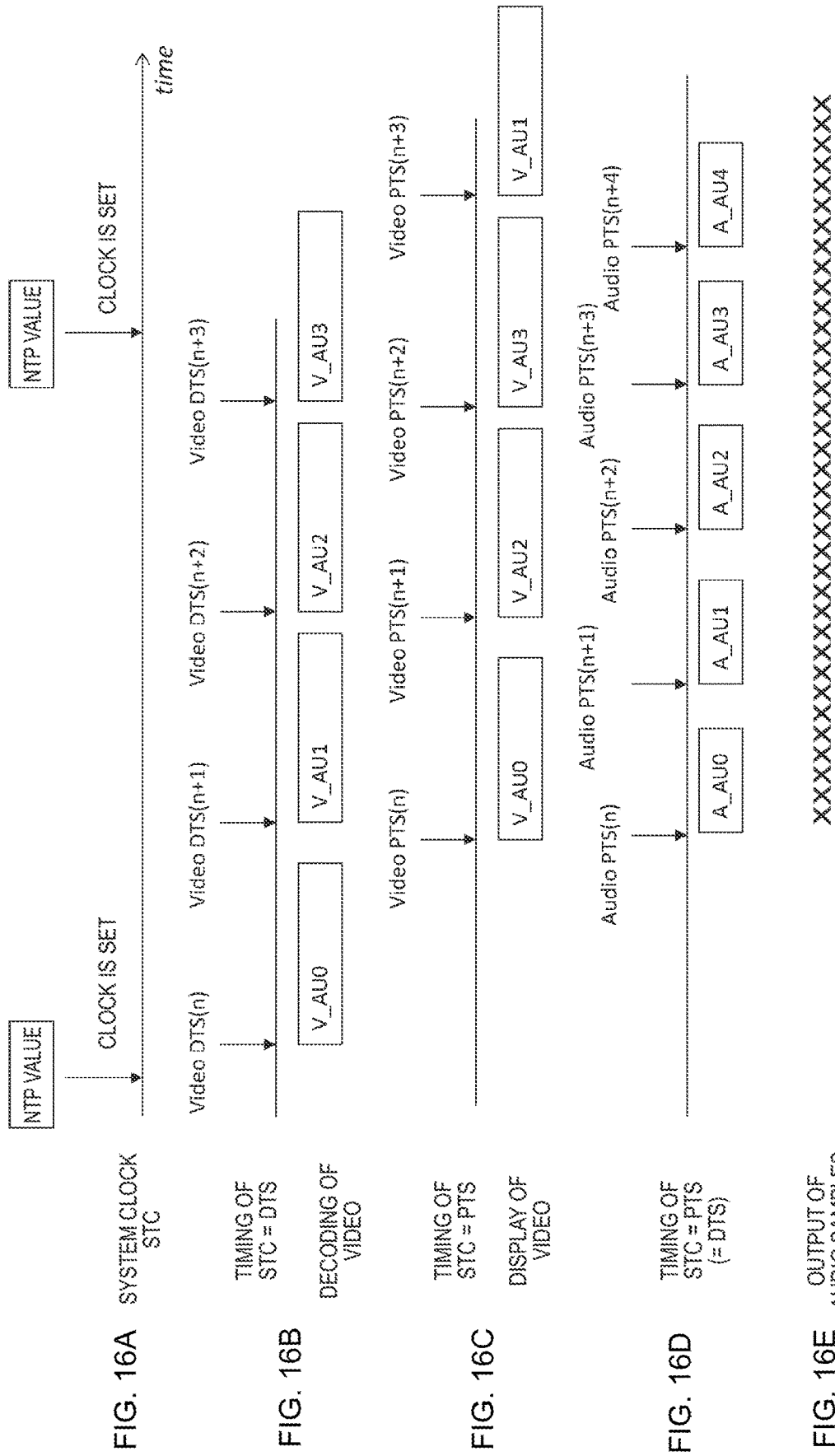

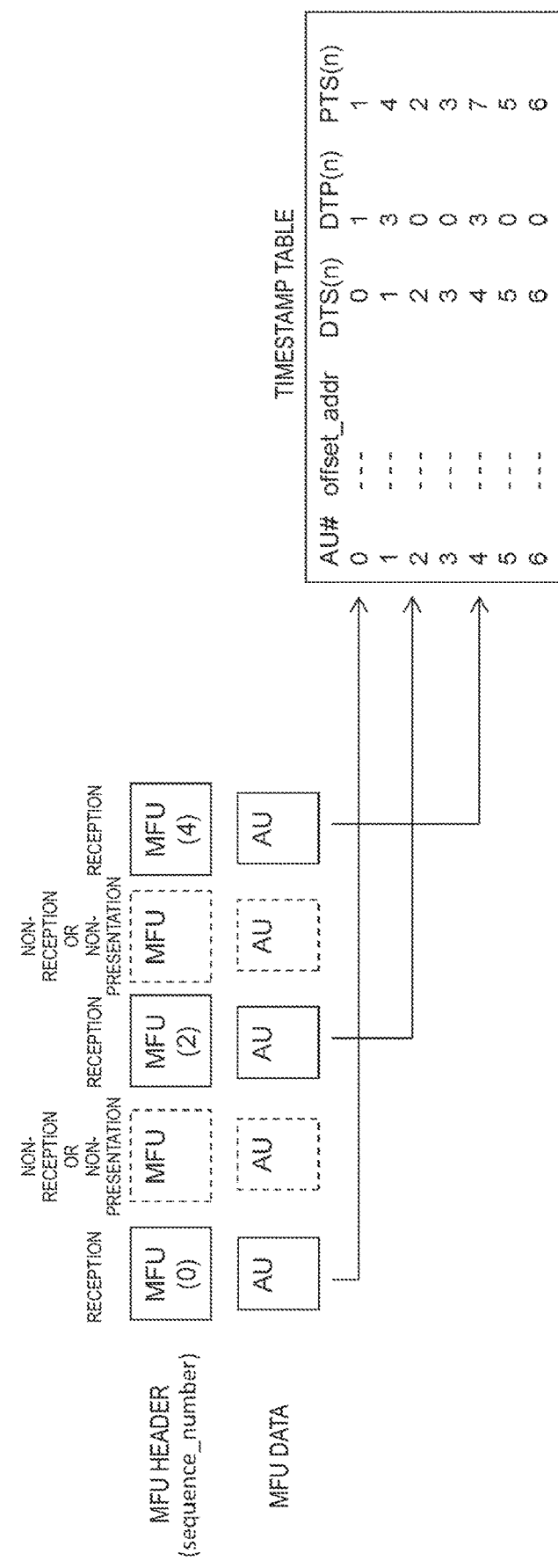

CASE WHERE TIME INFORMATION IS TRANSMITTED IN MPU PAYLOAD HEADER

CASE WHERE TIME INFORMATION IS TRANSMITTED IN MPU PAYLOAD FOR EACH AU FRAGMENT

CASE WHERE TIME INFORMATION IS TRANSMITTED IN MESSAGE

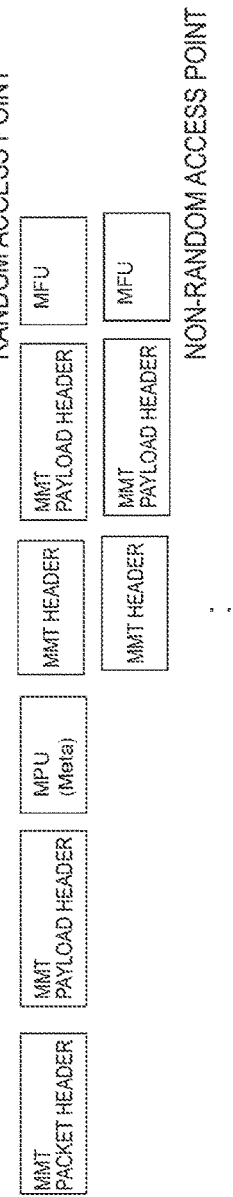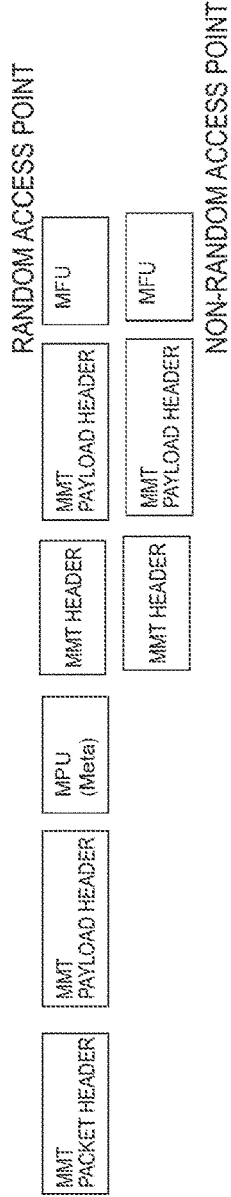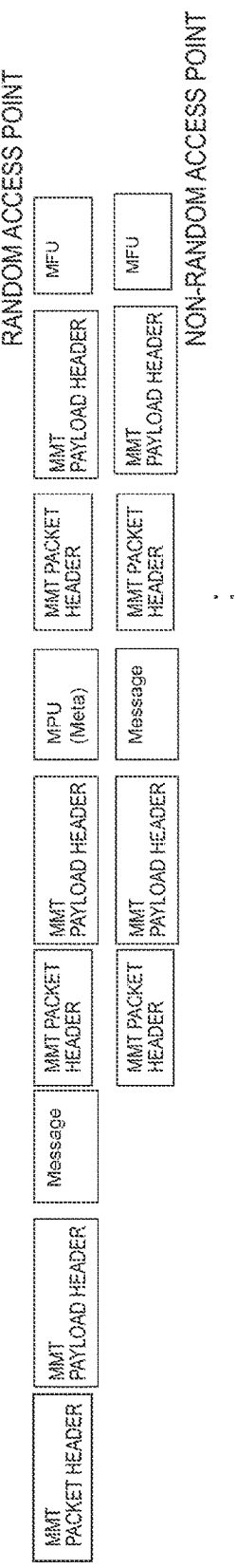

FIG.20

MMT packet overall

| Syntax | No. of Bits | Format |
|---|---|---|
| mmt packet( ) { | | |
|    mmtp_header() | | |
|    mmtp_payload() { | | |
|       mmtp_payload_header() | | |
|       mmtp_payload_data() | | |
|    } | | |
| } | | |

FIG.21

MMT packet_header

| Syntax | No. of Bits | Format |
|---|---|---|
| mmtp_header(){ | | |
| packet_id | 16 | uimsbf |
| packet_sequence_number | 32 | uimsbf |
| transmission_timestamp | 32 | uimsbf |
| QoS_classifier_flag | 1 | bslbf |
| flow_identifier_flag | 1 | bslbf |
| private_usesr_data_flag | 1 | bslbf |
| FEC_type | 2 | bslbf |
| reserved | 3 | bslbf |
| type_of_bitrate | 3 | bslbf |
| delay_sensitivity | 3 | bslbf |
| reliability_flag | 1 | bslbf |
| transmission_priority | 3 | bslbf |
| reserved | 1 | bslbf |
| flow_label | 7 | bslbf |
| extension_flag | 1 | bslbf |
| reserved | 5 | bslbf |
| private_user_data | 16 | bslbf |
| } | | |

FIG. 22

MMT payload header

| Syntax | No. of Bits | Format |
|---|---|---|
| mmtp_payload_header(){ | | |
| payload_length | 16 | uimsbf |
| payload_type | 8 | bslbf |
| fragmentation_indicator | 2 | bslbf |
| fragment_count_flag | 1 | bslbf |
| aggregation_info_flag | 1 | bslbf |
| random_access_point_flag | 1 | bslbf |
| payload_sequence_number_flag | 1 | bslbf |
| header_extension_field_flag | 1 | bslbf |
| reserved | 1 | bslbf |
| data_offset | 8 | uimsbf |
| if( fragment_count_flag == 1){ | | |
| fragment_count | 8 | uimsbf |
| numDU | 8 | uimsbf |
| if (aggregation_info_flag == 1){ | | |
| for ( I = 0 ; I < numDU ; i++ ) | | |
| DU_offset | 16 | uimsbf |
| } | | |
| if (payload_sequence_number_flag == 1) | | |
| payload_sequence_number | 32 | uimsbf |
| if (header_extension_field_flag == 1) | | |
| mmtp_payload_header_extension() | | |
| } | | |

FIG. 23

MMT payload header extension

| Syntax | No. of Bits | Format |
|---|---|---|
| mmtp_payload_header_extension() { | | |
|   payload_header_extension_type | 16 | bslbf |
|   payload_header_extension_length | 16 | uimsbf |
|   asset_type | 2 | bslbf |
|   delta_sequence_type | 1 | bslbf |
|   au_count_in_mpu | 10 | uimsbf |
|   au_rate_scale | 3 | uimsbf |
|   division_factor | 2 | bslbf |
|   time_tick | 2 | bslbf |
|   timestamp_type | 1 | bslbf |
|   reserved | 3 | bslbf |
|   timestamp_for_processing | 32 | uimsbf |
|   if(delta_sequence_type) { | | |
|     for ( i = 0; i < au_count_in_mpu ; i++ ) | | |
|       delta_variable_length_code | variable | bslbf |
|     trailing_filler() | | |
|   } else { | | |
|     for ( i = 0; i < au_count_in_mpu ; i++ ) | | |
|       delta_fixed_length_code | 8 | uimsbf |
|   } | | |
| } | | |

FIG. 24 semantics

```
payload_header_extension_type          16bits
    0x0001          providing timestamp for processing
payload_header_extension_length        16bits asset_type          2bits
    if(asset_type == 01) //video
        01          video
        10          audio
        others      reserved time_tick           2bits
    01              VALUE IN 90000-Hz PRECISION (LSB)
    10              NTP shorttime
    others          reserved au_rate_scale       3bits
    if(asset_type == 01) //video
        000         24Hz
        001         25Hz
        010         30Hz
        011         50Hz
        100         60Hz
        101         100Hz
        110         120Hz
        111         reserved
    else if (asset_type == 10 ) // audio
        000         1920       48KHz * 1024
        001         2089.8     44.1KHz * 1024
        010         2880       32KHz * 1024
        others      reserved
```

```
division_factor     2bits
    if(asset_type == 01) //video
        00          1
        01          1.001
        others      reserved
    else if (asset_type == 10 ) // audio
        00          1
        01          2
        others      reserved timestamp_type                             1bit
    1   timestamp is decode_timestamp
    0   timestamp is display_timestamp timestamp_for_processing                   32bits
    if time_tick is "01",
        timestamp is in 90KHz precision.
    if time_tick is "10",
        timestamp is NTP short timestamp
        specified in RFC5059.

au_count_in_mpu                            10bits delta_sequence_type                        1bit
    1   delta value in variable length coding
    0   delta value in fixed length coding
delta_fixed_length_code                    8bits
delta_variable_length_code                 variable
```

FIG.25

MMT payload header extension

| Syntax | No. of Bits | Format |
|---|---|---|
| mmtp_payload_header_extension() { | | |
|   payload_header_extension_type | 16 | bslbf |
|   payload_header_extension_length | 16 | uimsbf |
|   if (payload_header_extension_type == 0x01) | | |
|     presentation_timestamp  /* in NTP format*/ | 32 | uimsbf |
|   else if (mfu_payload_header_type == 0x02){ | | |
|     decoding_timestamp  /* in NTP format*/ | 32 | uimsbf |
|     presentation_timestamp  /* in NTP format*/ | 32 | uimsbf |
|   } | | |
|   else if (mfu_payload_header_type == 0x03) | | |
|     presentation_timestamp  /* in 90KHz */ | 32 | uimsbf |
|   else if (mfu_payload_header_type == 0x04){ | | |
|     decoding_timestamp  /* in 90KHz */ | 32 | uimsbf |
|     presentation_timestamp  /* in 90KHz */ | 32 | uimsbf |
|   } | | |
|   else{ | | |
|   } | | |
| } | | |

FIG.26 semantics payload_header_extension_type  (16bits)
    INDICATES TYPE OF MMT PAYLOAD HEADER EXTENSION
    0x01    SUPPLIES PRESENTATION TIMESTAMP IN NTP SHORT TIME FORMAT
    0x02    SUPPLIES PRESENTATION TIMESTAMP AND DECODING TIMESTAMP IN NTP SHORT TIME FORMAT
    0x03    SUPPLIES PRESENTATION TIMESTAMP IN 90-KHz PRECISION
    0x04    SUPPLIES PRESENTATION TIMESTAMP AND DECODING TIMESTAMP IN 90-KHz PRECISION
    others    reserved presentation_timestamp (32bits)
    VALUE OF PRESENTATION TIMESTAMP
decoding_timestamp (32bits)
    VALUE OF DECODING TIMESTAMP

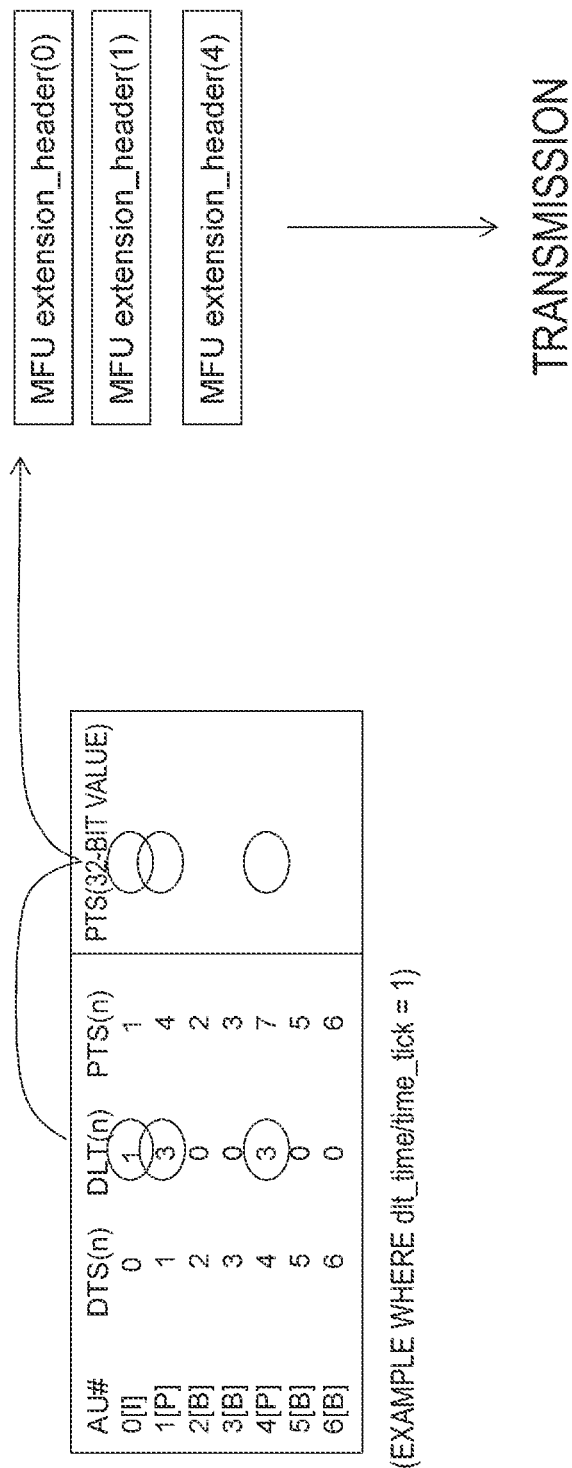

FIG.28

MFU

| Syntax | No. of Bits | Format |
|---|---|---|
| mfu(){ | | |
|     mfu_header() | | |
|     mfu_media_data() | | |
| | | |
| } | | |

FIG.29

MFU header

| Syntax | No. of Bits | Format |
|---|---|---|
| mfu_header(){ | | |
|     sequence_number | 32 | uimsbf |
|     if (is_timed) { | | |
|         trackref_index | 8 | uimsbf |
|         sample_number | 32 | uimsbf |
|         priority | 8 | bslbf |
|         dependency_counter | 8 | bslbf |
|         offset | 16 | uimsbf |
|         length | 32 | uimsbf |
|         multiLayer_flag | 1 | bslbf |
|         mfu_header_extension_flag | 1 | bslbf |
|         reserved | 6 | bslbf |
|         if(multilayer_flag == 1){ | | |
|             dependency_id | 3 | bslbf |
|             depth_flag | 1 | bslbf |
|             reserved | 4 | bslbf |
|             temporal_id | 4 | bslbf |
|             quality_id | 4 | bslbf |
|             priority_id | 6 | bslbf |
|             view_id | 10 | bslbf |

*Continued from previous page*

| Syntax | No. of Bits | Format |
|---|---|---|
| } else { | | |
|     layer_id | 6 | bslbf |
|     temporal_id | 3 | bslbf |
|     reserved | 23 | bslbf |
| } | | |
| if (mfu_header_extension_flag == 1) { | | |
|     mfu_header_extension() | | |
| } | | |
| } else { | | |
|     item_ID | 16 | bslbf |
| } | | |
| } | | |

FIG.31

Semantics

| | |
|---|---|
| sequence_number | SEQUENCE NUMBER OF MFU IN MPU |
| trackref_index | MEDIA TRACK NUMBER |
| sample_number | ORDINAL NUMBER OF SAMPLE (ACCESS UNIT) TO WHICH RELEVANT MFU BELONGS, IN BOX moof |
| priority | PRIORITY LEVEL OF RELEVANT MFU IN MPU |
| dependency_counter | NUMBER OF MFU'S ON WHICH DECODING DEPENDS IN RELEVANT MFU |
| offset | OFFSET FROM BOX mdat |
| length | SIZE OF MFU |
| multiLayer_flag | PRESENCE OR ABSENCE OF MULTILAYER INFORMATION |
| mfu_header_extension_flag | PRESENCE OR ABSENCE OF mfu_extension |
| dependency_id | |
| depth_flag | |
| temporal_id | |
| quality_id | ID'S INDICATING VARIOUS DEPENDENCE RELATIONSHIPS BETWEEN MFU'S |
| priority_id | |
| view_id | |
| layer_id | |
| item_ID | ID OF FILE |

FIG.32

| Syntax | No. of Bits | Format |
|---|---|---|
| mfu_header_extension(){ | | |
| mfu_header_extension_type | 8 | bslbf |
| mfu_extension_length | 8 | uimsbf |
| asset_type | 2 | bslbf |
| au_rate_scale | 3 | uimsbf |
| division_factor | 2 | bslbf |
| time_tick | 2 | bslbf |
| timestamp_type | 1 | bslbf |
| reserved | 6 | bslbf |
| timestamp_for_processing | 32 | uimsbf |
| delta_fixed_length_code | 8 | uimsbf |
| } | | |

FIG. 33 semantics

| | | |
|---|---|---|
| asset_type | 2bits | |
| 01 | video | |
| 10 | audio | |
| others | reserved | |
| Time tick | 2bits | |
| 01 | 90000 Hz | |
| 10 | NTP shorttime | |
| others | reserved | |
| AU_rate_scale | 3bits | |
| if(asset_type == 01) // video | | |
| 000 | 3750 | 24Hz |
| 001 | 3600 | 25Hz |
| 010 | 3000 | 30Hz |
| 011 | 1800 | 50Hz |
| 100 | 1500 | 60Hz |
| 101 | 900 | 100Hz |
| 110 | 750 | 120Hz |
| 111 | reserved | |
| else if (asset_type == 10) // audio | | |
| 000 | 1920 | 48KHz * 1024 |
| 001 | 2089.8 | 44.1KHz * 1024 |
| 010 | 2880 | 32KHz * 1024 |
| others | reserved | |

| | | |
|---|---|---|
| division_factor | 2bits | |
| if(asset_type == 01) // video | | |
| 00 | 1 | |
| 01 | 1.001 | |
| others | reserved | |
| else if (asset_type == 10) // audio | | |
| 00 | 1 | |
| 01 | 2 | |
| timestamp_type | 1bit | |
| 1  timestamp is decode_timestamp | | |
| 0  timestamp is display_timestamp | | |
| timestamp_for_processing | 32bits | |
| if time_tick is "01", timestamp is in 90KHz precision. | | |
| if time_tick is "10", timestamp is NTP short timestamp specified in RFC5059. | | |
| delta_fixed_length_code | 8bits | |

FIG. 34

MFU header

| Syntax | No. of Bits | Format |
|---|---|---|
| mfu_header(){ | | |
|   sequence_number | 32 | uimsbf |
|   if (is_timed) { | | |
|     trackref_index | 8 | bslbf |
|     sample_number | 32 | uimsbf |
|     priority | 8 | bslbf |
|     dependency_counter | 8 | bslbf |
|     offset | 16 | uimsbf |
|     length | 32 | uimsbf |
|     multiLayer_flag | 1 | bslbf |
|     timestamp_type | 2 | bslbf |
|     time_tick | 1 | bslbf |
|     reserved | 4 | bslbf |
|     if(multilayer_flag == 1){ | | |
|       dependency_id | 3 | bslbf |
|       depth_flag | 1 | bslbf |
|       reserved | 4 | bslbf |
|       temporal_id | 4 | bslbf |
|       quality_id | 4 | bslbf |
|       priority_id | 6 | bslbf |
|       view_id | 10 | bslbf | continued

FIG.35

Continued from previous page

| Syntax | No. of Bits | Format |
|---|---|---|
| } else { | | |
|   layer_id | 6 | bslbf |
|   temporal_id | 3 | bslbf |
|   reserved | 23 | bslbf |
| } | | |
| } else { | | |
|   item_ID | 16 | bslbf |
| } | | |
| } | | |

FIG.36 semantics

Timestamp_type (2bits)
INDICATES WHETHER OR NOT TIMESTAMP IS SUPPLIED AT HEAD OF MFU PAYLOAD
00   TIMESTAMP IS NOT SUPPLIED. 1ST BYTE OF MFU PAYLOAD IS EQUAL TO HEAD BYTE OF FRAGMENTED MPU PAYLOAD
01   PRESENTATION TIMESTAMP IS SUPPLIED AT HEAD OF MFU PAYLOAD. HEAD BYTE OF FRAGMENTED MPU PAYLOAD IS SUPPLIED IMMEDIATELY AFTER PRESENTATION TIMESTAMP
10   DECODING TIMESTAMP AND PRESENTATION TIMESTAMP ARE BOTH SUPPLIED AT HEAD OF MFU PAYLOAD. HEAD BYTE OF FRAGMENTED MPU PAYLOAD IS SUPPLIED IMMEDIATELY AFTER TIMESTAMPS
11   reserved Time tick (1bit)
DESCRIBES PRECISION OF VALUE OF TIMESTAMP
0    90000 Hz PRECISION
1    NTP short time FORMAT

FIG.37

| Syntax | No. of Bits | Format |
|---|---|---|
| mfu_payload(){ | | |
|   if( timestamp_type == 01) | | |
|     presentation_timestamp | 32 | uimsbf |
|   else if( timestamp_type == 10){ | | |
|     decoding_timestamp | 32 | uimsbf |
|     presentation_timestamp | 32 | uimsbf |
|   } | | |
|   else{ | | |
|   } | | |
|   payload_data | | |
| } | | | semantics presentation_timestamp (32bits)
    VALUE OF PRESENTATION TIMESTAMP
decoding_timestamp (32bits)
    VALUE OF DECODING TIMESTAMP

FIG. 38

| Syntax | No. of Bits | Format |
|---|---|---|
| Mfu_header(){ | | |
|   sequence_number | 32 | uimsbf |
|   if (is_timed) { | | |
|     trackref_index | 8 | bslbf |
|     sample_number | 32 | uimsbf |
|     priority | 8 | bslbf |
|     dependency_counter | 8 | bslbf |
|     offset | 16 | uimsbf |
|     length | 32 | uimsbf |
|     multiLayer_flag | 1 | bslbf |
|     payload_header_flag | 1 | bslbf |
|     reserved | 6 | bslbf |
|     if(multilayer_flag == 1){ | | |
|       dependency_id | 3 | bslbf |
|       depth_flag | 1 | bslbf |
|       reserved | 4 | bslbf |
|       temporal_id | 4 | bslbf |
|       quality_id | 4 | bslbf |
|       priority_id | 6 | bslbf |
|       view_id | 10 | bslbf |

*Continued to next page*

FIG.39

Continued from previous page

| Syntax | No. of Bits | Format |
|---|---|---|
| } else { | | |
| layer_id | 6 | bslbf |
| temporal_id | 3 | bslbf |
| reserved | 23 | bslbf |
| } | | |
| } else { | | |
| item_ID | 16 | bslbf |
| } | | |
| } | | |

FIG.40 semantics

Payload_header_flag (1bit)
INDICATES WHETHER OR NOT MFU PAYLOAD HEADER IS PRESENT AT HEAD OF MFU PAYLOAD 0   MFU PAYLOAD HEADER IS NOT PRESENT. 1ST BYTE OF MFU PAYLOAD IS EQUAL TO HEAD BYTE OF FRAGMENTED MPU PAYLOAD 1   MFU PAYLOAD HEADER IS PRESENT. HEAD BYTE OF FRAGMENTED MPU PAYLOAD IS SUPPLIED IMMEDIATELY AFTER MFU PAYLOAD HEADER

FIG. 41

| Syntax | No. of Bits | Format |
|---|---|---|
| mfu_payload(){ | | |
|   if (payload_header_flag == 1){ | | |
|     mfu_payload_header_type | 8 | bslbf |
|     mfu_payload_header_length | 8 | uimsbf |
|     if (mfu_payload_header_type == 0x01){ | | |
|       presentation_timestamp   /* in NTP format*/ | 32 | uimsbf |
|     else if (mfu_payload_header_type == 0x02){ | | |
|       decoding_timestamp   /* in NTP format*/ | 32 | uimsbf |
|       presentation_timestamp   /* in NTP format*/ | 32 | uimsbf |
|     } | | |
|     else if (mfu_payload_header_type == 0x03) | | |
|       presentation_timestamp   /* in 90KHz */ | 32 | uimsbf |
|     else if (mfu_payload_header_type == 0x04){ | | |
|       decoding_timestamp   /* in 90KHz */ | 32 | uimsbf |
|       presentation_timestamp   /* in 90KHz */ | 32 | uimsbf |
|     } | | |
|   else{ | | |
|   } | | |
|   payload_data | | |
| } | | |

FIG.42 semantics mfu_payload_header_type (8bits)
  INDICATES TYPE OF MFU PAYLOAD HEADER 0x01   SUPPLIES PRESENTATION TIMESTAMP IN NTP SHORT TIME FORMAT
  0x02   SUPPLIES PRESENTATION TIMESTAMP AND DECODING TIMESTAMP IN NTP SHORT TIME FORMAT 0x03   SUPPLIES PRESENTATION TIMESTAMP IN 90-KHZ PRECISION
  0x04   SUPPLIES PRESENTATION TIMESTAMP AND DECODING TIMESTAMP IN 90-KHZ PRECISION others   reserved mfu_payload_header_length (8bits)
  INDICATES SIZE OF mfu PAYLOAD HEADER AFTER THIS ELEMENT IN NUMBER OF BYTES presentation_timestamp (32bits)
  VALUE OF PRESENTATION TIMESTAMP
decoding_timestamp (32bits)
  VALUE OF DECODING TIMESTAMP

FIG. 43

Timestamp Message

| Syntax | No. of Bits | Format |
|---|---|---|
| timestamp_message() { | | |
|   message_id | 16 | |
|   version | 8 | |
|   length | 16 | |
|   extension { | | |
|     timestamp_table() | | |
|   } | | |
| } | | |

FIG.44

| Syntax | No. of Bits | Format |
|---|---|---|
| Timestamp_table() { | | |
|     table_id | 8 | uimsbf |
|     version | 8 | uimsbf |
|     length | 16 | uimsbf |
|     packet_id | 16 | uimsbf |
|     asset_type | 2 | bslbf |
|     delta_sequence_type | 1 | bslbf |
|     au_count_in_mpu | 10 | uimsbf |
|     au_rate_scale | 3 | uimsbf |
|     division_factor | 2 | bslbf |
|     time_tick | 2 | bslbf |
|     timestamp_type | 1 | bslbf |
|     reserved | 3 | bslbf |
|     timestamp_for_processing | 32 | uimsbf |
|     if(delta_sequence_type ) { | | |
|         for (i = 0; i < au_count_in_mpu ; i++ ) | | |
|             delta_variable_length_code | variable | |
|         trailing_filler() | | |
|     } else{ | | |
|         for (i = 0; i < au_count_in_mpu ; i++ ) | | |
|             delta_fixed_length_code | 8 | uimsbf |
|     } | | |
| } | | |

FIG.45

Package Access Message

| Syntax | No. of Bits | Format |
|---|---|---|
| Package_Access_message() { | | |
|   message_id | 16 | uimsbf |
|   version | 8 | uimsbf |
|   length | 32 | uimsbf |
|   extension { | | |
|     number_of_tables ; N1 | 8 | uimsbf |
|     for ( i=0; I < N1; i++ ) { | | |
|       table_id | 8 | uimsbf |
|       table_version | 8 | uimsbf |
|       table_length | 16 | uimsbf |
|     } | | |
|   message_payload { | | |
|     for (i=0; I < N1; i++ ){ | | |
|       table() | | |
|     } | | |
|   } | | |
| } | | |

FIG.46

| Time      | 0    | 1    | 2    | 3    | 4    | 5    | 6    | 7    |
|-----------|------|------|------|------|------|------|------|------|
| Dec(AU)   | D(0) | D(1) | D(2) | D(3) | D(4) | D(5) | D(6) | D(7) |
| Display(AU) |    | R(0) | R(2) | R(3) | R(1) | R(5) | R(6) | R(4) |
| DLT(AU)   | 1    | 3    | 0    | 0    | 3    | 0    | 0    | 3    |

FIG.47

VARIABLE LENGTH CODE TABLE

| CODING INPUT VALUE | VARIABLE LENGTH CODE | CODE LENGTH (BITS) |
|---|---|---|
| 0 :: | 1 | 1 |
| 1 :: | 010 | 3 |
| 2 :: | 011 | 3 |
| 3 :: | 00100 | 5 |
| 4 :: | 00101 | 5 |
| 5 :: | 00110 | 5 |
| 6 :: | 00111 | 5 |
| 7 :: | 0001000 | 7 |
| 8 :: | 0001001 | 7 |
| 9 :: | 0001010 | 7 |
| 10 :: | 0001011 | 7 |
| 11 :: | 0001100 | 7 |
| 12 :: | 0001101 | 7 |
| 13 :: | 0001110 | 7 |
| 14 :: | 0001111 | 7 |
| 15 :: | 000010000 | 9 |

NUMBER OF SUCCESSIVE "0"S INDICATES CODE LENGTH.
CODE LENGTH IS 1 IF THERE IS NO "0" AND 3 IF THERE IS ONE "0."
CODE LENGTH IS 5 IF THERE ARE TWO "0"S AND 7 IF THERE ARE THREE "0"S.

FIG. 48

ESTIMATION OF CODE LENGTH

| GOP length (M) | TOTAL BIT LENGTH | FIXED 4-BIT LENGTH |
|---|---|---|
| M = 3 (IPBB) IBBP B_probability: 2/4 | 3 + 5 + 2 = 10 (3+7) bits | 16 bits |
| M = 4 (IPBBB) IBBBP B_probability: 3/5 | 3 + 5 + 3 = 11 (3+8) bits | 20 bits |
| M = 5 (IPBBBB) IBBBBP B_probability: 4/6 | 3 + 5 + 4 = 12 (3+9) bits | 24 bits |
| M = 6 (IPBBBBB) IBBBBBP B_probability: 5/7 | 3 + 5 + 5 = 13 (3+10) bits | 28 bits |
| M = 7 (IPBBBBBB) IBBBBBBP B_probability: 6/8 | 3 + 7 + 6 = 16 (3+13) bits | 32 bits |
| M = 8 (IPBBBBBBB) IBBBBBBBP B_probability: 7/9 | 3 + 7 + 7 = 17 (3+14) bits | 36 bits |
| M = 15 (IPBBBBBBBBBBBBBB) IBBBBBBBBBBBBBBP B_probability: 14/16 | 3 + 9 + 14 = 26 (3+23) bits | 64 bits |

TRANSMISSION APPARATUS, TRANSMISSION METHOD, RECEPTION APPARATUS, AND RECEPTION METHOD

CROSS-REFERENCE TO RELATED APPLICATIONS

This application is a divisional of U.S. patent application Ser. No. 14/764,768, filed Jul. 30, 2015, which is a 371 of International Patent Application No. PCT/JP2014/56574, filed Mar. 12, 2014, which claims the benefit of priority from Japanese Patent Application No. 2013-052559, filed Mar. 14, 2013, and Japanese Patent Application No. 2013-100774, filed May 10, 2013. The contents of U.S. patent application Ser. No. 14/764,768 are incorporated herein by reference in their entirety.

TECHNICAL FIELD

The present technology relates to transmission apparatuses, transmission methods, reception apparatuses, and reception methods, and more particularly, to a transmission apparatus that transmits transport media, such as video, audio, and the like, through an RF communication channel or a communication network communication channel, and the like.

BACKGROUND ART

MPEG2-TS is conventionally used as a transport structure for broadcasting as described in Patent Literature 1, for example.

CITATION LIST

Patent Literature

Patent Literature 1: JP 2011-217161A

SUMMARY OF INVENTION

Technical Problem

The MPEG Media Transport (MMT) structure has in recent years been becoming attractive as a transport structure for next-generation broadcasting. A major feature of the MMT structure is its compatibility with IP networks.

An object of the present technology is to allow for reliable transport of time information for obtaining decoding time and/or presentation time to a receiver in a transport structure for next-generation broadcasting.

Solution to Problem

A concept of the present technology is a transmission apparatus including: a transport stream generation unit configured to generate a transport stream in which a first transport packet containing transport media in a payload and a second transport packet containing information about the transport media in a payload, are time-division multiplexed; a transport stream transmission unit configured to transmit the transport stream to a receiver through a predetermined transmission channel; and a time information insertion unit configured to insert time information for allowing the receiver to obtain decoding time and/or presentation time into the first transport packet or the second transport packet.

In the present technology, the transport stream generation unit generates a transport stream. In the transport stream, a first transport packet containing transport media in a payload and a second transport packet containing information about the transport media in a payload, are time-division multiplexed. For example, the first transport packet and the second transport packet may be MMT packets. The transport stream transmission unit transmits the transport stream to a receiver through a predetermined transmission channel. For example, the predetermined transmission channel may be an RF transmission channel or a communication network transmission channel.

The time information insertion unit inserts time information for allowing a receiver to obtain decoding time and/or presentation time into the first transport packet or the second transport packet. For example, the transport media contained in the first transport packet may include one or more access units, and the time information inserted by the time information insertion unit may be information for obtaining decoding time and/or presentation time corresponding to each of the one or more access units.

In this case, the time information inserted by the time information insertion unit may have a value of decoding time or presentation time corresponding to the initial access unit of the one or more access units, and an offset value from decoding time to presentation time each corresponding to each access unit. This use of the offset value allows for efficient delivery of the time information. Further, in this case, the time information inserted by the time information insertion unit may be presentation time, or presentation time and decoding time, corresponding to each of the one or more access units. This delivery of the presentation time itself, or the presentation time and the decoding time themselves, can reduce a process load on a receiver.

In this case, the offset value may be a relative offset value corresponding to an absolute offset value, and conversion information for converting the relative offset value into the absolute offset value may be added to the time information inserted by the time information insertion unit. This use of the relative offset value allows for efficient delivery of the offset value to a receiver. For example, the time information insertion unit may insert the relative offset value after variable length coding. This use of variable length coding can reduce time information transmission capacity.

For example, the payload of the first transport packet may include a payload header portion and a payload body portion, and the time information insertion unit may insert the time information into the payload header portion. For example, the payload of the first transport packet may include a payload header portion and a payload body portion, in the payload body portion, fragment payloads each containing one or more access units obtained by fragmenting the transport media, may be provided together with fragment headers, and the time information insertion unit may insert, into the fragment header or the fragment payload, time information of the corresponding access unit. For example, the payload of the second transport packet may include a payload header portion and a payload body portion, and the time information insertion unit may insert the time information into the payload body portion.

Thus, in the present technology, time information for allowing a receiver to obtain decoding time and presentation time is inserted in the first transport packet or the second transport packet, and in a transport structure for next-generation broadcasting, the time information for obtaining decoding time and/or presentation time can be reliably delivered to a receiver.

Another concept of the present technology is a reception apparatus including: a transport stream reception unit configured to receive a transport stream in which a first transport packet containing transport media in a payload and a second transport packet containing information about the transport media in a payload, are time-division multiplexed, from a transmitter through a predetermined transmission channel. Time information for obtaining decoding time and/or presentation time is inserted in the first transport packet or the second transport packet. The reception apparatus further includes a transport media processing unit configured to process the transport media extracted from the transport stream using the decoding time and/or presentation time obtained based on the time information.

In the present technology, the transport stream reception unit receives a transport stream from a transmitter through a predetermined transmission channel. In the transport stream, a first transport packet containing transport media in a payload and a second transport packet containing information about the transport media in a payload, are time-division multiplexed. Time information for obtaining decoding time and/or presentation time is inserted in the first transport packet or the second transport packet. The transport media processing unit processes transport media extracted from the transport stream using the decoding time and/or presentation time obtained based on the time information.

For example, the transport media contained in the first transport packet may include one or more access units, the time information may be a value of decoding time or presentation time corresponding to an initial access unit of the one or more access units, and a relative offset value corresponding to an absolute offset value from decoding time to presentation time each corresponding to each access unit, and the reception apparatus may further include an offset value conversion unit configured to convert the relative offset value into the absolute offset value.

Thus, in the present technology, time information for obtaining decoding time and/or presentation time is inserted in the first transport packet or the second transport. Decoding time and/or presentation time can be obtained based on the time information, and transport media extracted from a transport stream can be reliably processed.

Advantageous Effects of Invention

According to the present technology, in a transport structure for next-generation broadcasting, time information for obtaining decoding time and/or presentation time can be reliably delivered to a receiver. Note that the advantages described herein are for illustrative purposes only and are not intended to be limited, and there may be additional advantages.

BRIEF DESCRIPTION OF DRAWINGS

FIGS. 16A-16E are timing charts showing an example AV synchronous reproduction control in a control unit.

FIG. 17 is a diagram for describing a case where a packet which is an MFU fragment is dropped during transmission of the packet.

FIGS. 19A-19C are diagrams showing an example packet configuration in a case where time information (timestamp) is inserted, corresponding to each access unit, in order to reduce a delay in transmission/reception.

FIG. 20 is a diagram showing an example structure of an entire MMT packet.

FIG. 21 is a diagram showing an example structure of an MMT packet header (mmtp_header( )).

FIG. 22 is a diagram showing an example structure of an MMT payload header (mmtp_payload_header( )).

FIG. 23 is a diagram showing an example structure of an MMT payload header extension (mmtp_payload_header_extension( )).

FIG. 24 is a diagram showing semantics of major information of an example structure of an MMT payload header extension.

FIG. 25 is a diagram showing another example structure of an MMT payload header extension (mmtp_payload_header_extension( )).

FIG. 26 is a diagram showing semantics of major information of another example structure of an MMT payload_header_extension.

FIG. 27 is a diagram for describing a case where time information is transmitted in an MPU payload for each access unit which is a fragment.

FIG. 28 is a diagram showing an example structure (syntax) of an MFU.

FIG. 29 is a diagram showing an example structure of an MFU header (mfu_header( )).

FIG. 30 is a diagram showing an example structure of an MFU header (mfu_header( )).

FIG. 31 is a diagram showing semantics of major information of an example structure of an MFU header.

FIG. 32 is a diagram showing an example structure of an MFU header extension (mfu_header_extension( )).

FIG. 33 is a diagram showing semantics of major information of an example structure of an MFU header extension.

FIG. 34 is a diagram showing an example structure of an MFU header (mfu_header( )) in a case where time information is inserted in an MFU payload.

FIG. 35 is a diagram showing an example structure of an MFU header (mfu_header( )) in a case where time information is inserted in an MFU payload.

FIG. 36 is a diagram showing semantics of major information of an example structure of an MFU header in a case where time information is inserted in an MFU payload.

FIG. 37 is a diagram showing an example structure of an MFU payload (mfu_payload( )) and semantics of the major information.

FIG. 38 is a diagram showing another example structure of an MFU header (mfu_header( )) in a case where time information is inserted in an MFU payload.

FIG. 39 is a diagram showing another example structure of an MFU header (mfu_header( )) in a case where time information is inserted in an MFU payload.

FIG. 40 is a diagram showing semantics of major information of another example structure of an MFU header in a case where time information is inserted in an MFU payload.

FIG. 41 is a diagram showing an example structure of an MFU payload (mfu_payload( )).

FIG. 42 is a diagram showing semantics of major information of an example structure of an MFU payload.

FIG. 43 is a diagram showing an example structure (syntax) of a timestamp message.

FIG. 44 is a diagram showing an example structure (syntax) of a timestamp table (timestamp_table( )).

FIG. 45 is a diagram showing an example structure (syntax) of a package access message.

FIG. 46 is a diagram showing an example correspondence relationship between decoding time D(n) and presentation time R(n) of an access unit AU(n).

FIG. 47 is a diagram showing an example variable length code table for performing variable length coding on a time series of offset values.

FIG. 48 is a diagram showing that as a reorder distance M increases, the efficiency of reduction of transmission capacity due to variable length coding increases.

DESCRIPTION OF EMBODIMENTS

Figure 1:
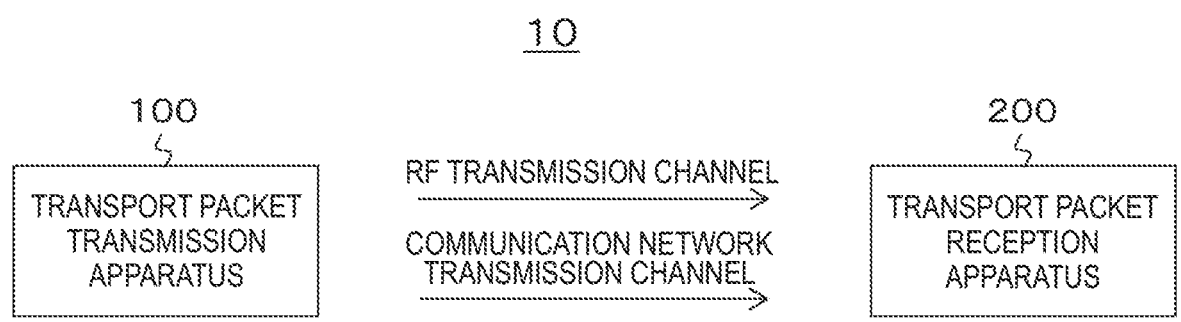
FIG. 1 is a block diagram showing an example configuration of a transmission reception system according to an embodiment.

Embodiments for carrying out the present invention (hereinafter referred to as "embodiments") will now be described. Note that description will be provided in the following order.
1. Embodiments
2. Variations 1. Embodiments Example Configuration of Transmission/Reception System FIG. 1 shows an example configuration of a transmission/reception system 10 as an embodiment. The transmission/reception stem 10 includes a transport packet transmission apparatus 100 and a transport packet reception apparatus 200.

The transmission apparatus 100 generates transport packets of the MMT structure (see ISO/IEC CD 23008-1), i.e., a transport stream containing MMT packets, and transmits the transport stream to a receiver through an RF transmission channel or a communication network transmission channel. In the transport stream, a first MMT packet containing transport media, such as video or audio, in a payload, and a second MMT packet containing information about the transport media in a payload, are time-division multiplexed using at least the size of a fragmented packet. In this embodiment, time information for allowing a receiver to obtain decoding time and presentation time is inserted in the first MMT packet or the second MMT packet.

The reception apparatus 200 receives the above transport stream from a transmitter through an RF transmission channel or a communication network transmission channel. The reception apparatus 200 processes the transport media extracted from the transport stream using the decoding time and/or presentation time obtained based on the time information, to display an image and output a sound.

Figure 2:
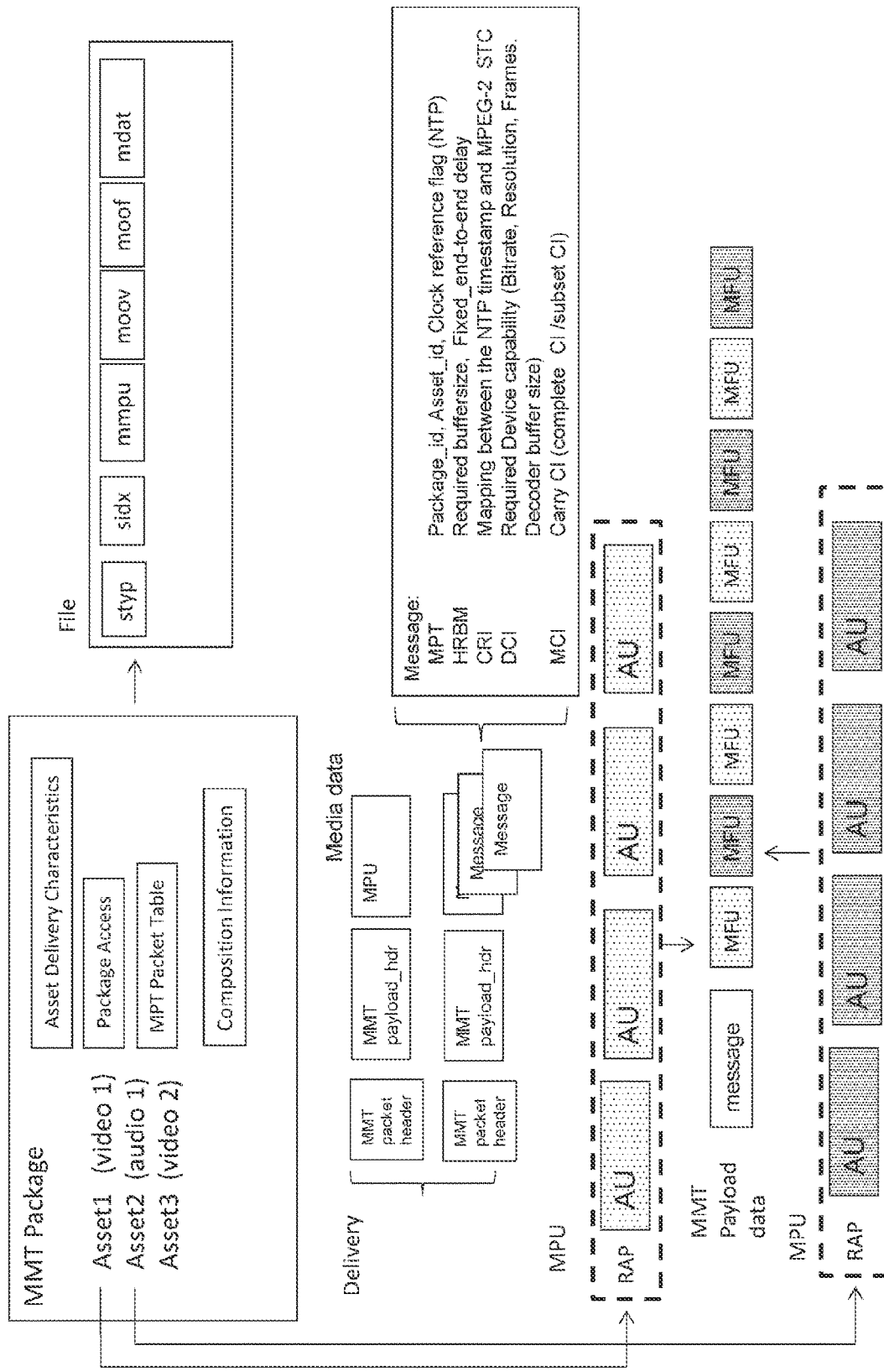
FIG. 2 is a diagram schematically showing a configuration of an MMT payload.

FIG. 2 schematically shows a configuration of an MMT payload. In FIG. 2, an MMT package is a logical concept of MMT, and means a transport material. The MMT package contains assets that are media, asset delivery characteristics, messages accompanying the package (package access), information about an MMT packet table (MPT packet table), composition information, and the like. The composition information is information that is used to perform a presentation control on media. In this example, Asset1 is data of video 1, Asset2 is data of audio 1, and Asset3 is data of video 2.

FIG. 2 shows an example file configuration in a case where the MMT package is actually an MMT file. This file configuration is basically almost the same as the file configuration of MP4. At the head, there is a box "styp." This is followed by a box "sidx" as segment information. This is followed by a box "mmpu," which is unique to MMT. This is followed by a box "moov" as meta-data of an entire file. This is also followed by a box "moof" and a box "mdat." The box "mdat" contains actual data, such as video, audio, subtitles, or the like. Note that when "mdat" is fragmented, the box "moof" is provided for each fragment.

When the MMT package is delivered, the MMT package is delivered in units of media processing units (MPUs) as shown in FIG. 2. The MPU, which begins with a random access point (RAP), contains one or a plurality of access units (AUs). Specifically, for example, one group of pictures (GOP) may constitute one MPU. This MPU is defined for each asset. Therefore, an MPU of video containing only video data is generated from a video asset, and an MPU of audio containing only audio data is generated from an audio asset.

As shown in FIG. 2, MPUs and a message constitute an MMT payload. The message contains information, such as the above composition information and the like. MMT fragment units (MFUs) are obtained by dividing an MPU, i.e., fragmenting an MPU. For example, in the case of video, the MFU may be set to correspond to one NAL unit. Also, for example, when a communication network transmission channel is used for transmission, the MFU may include one or a plurality of MTU sizes.

As shown in FIG. 2, the MMT payload is delivered in MMT packets. The MMT packet includes an MMT packet header and an MMT packet payload. Also, the MMT packet payload includes an MMT payload header and MMT payload data. MPUs or a message is inserted in the MMT payload data.

MFUs obtained by fragmenting MPUs of assets are time-division multiplexed as shown in FIG. 2. An MPU is a certain long time unit of, for example, 15 frames or 30 frames. Unless each MPU is fragmented and time-division multiplexing is performed, audio data cannot be transmitted during a certain long period of time when video data is being transmitted. Therefore, a large buffer capacity is required in order to adjust the timing, and in addition, there is a large delay in outputting an image or a sound. Such a problem can be solved by fragmenting each MPU and performing time-division multiplexing.

Figure 3:
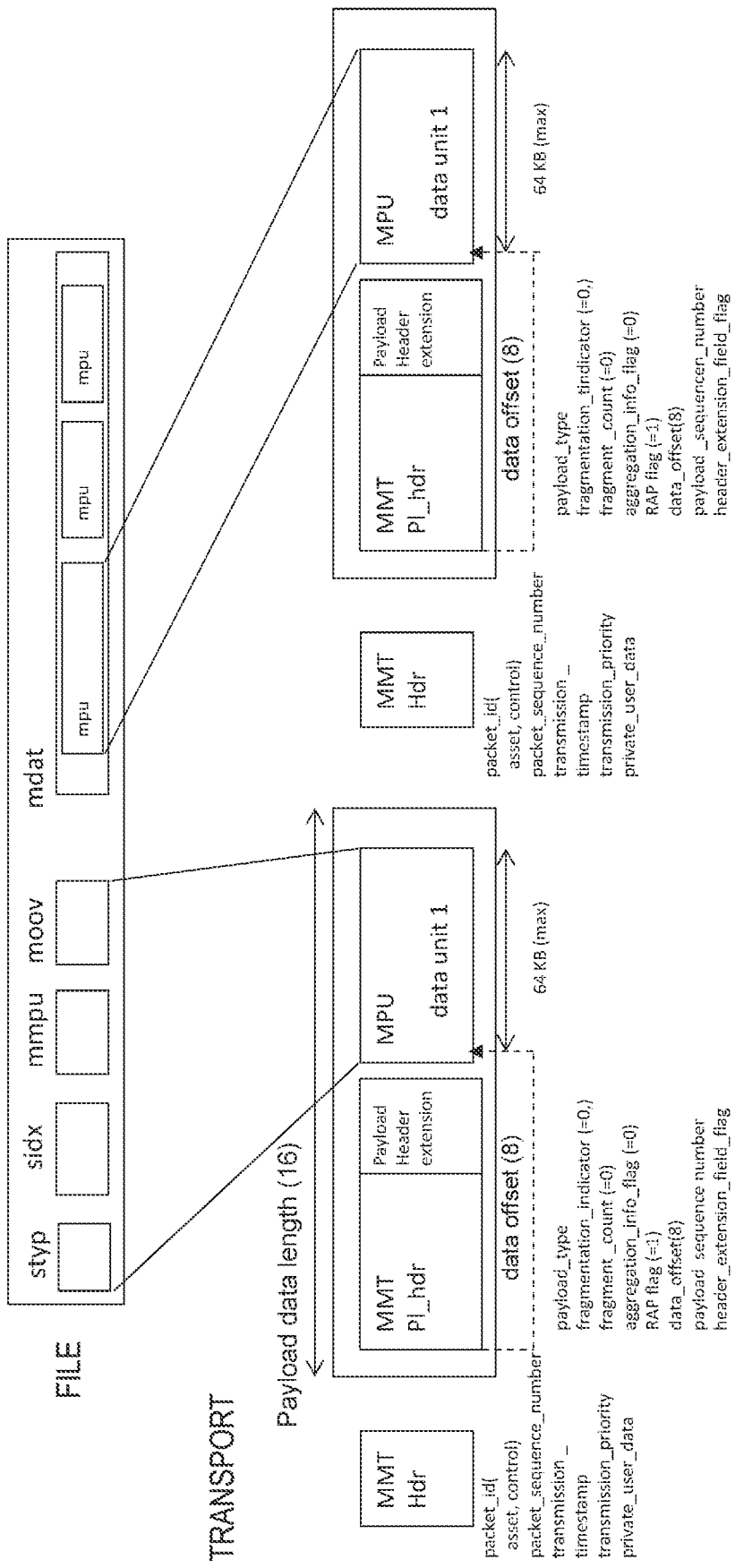
FIG. 3 is a diagram showing an example correspondence relationship between an MMT file and MMT packets actually delivered.
Figure 4:
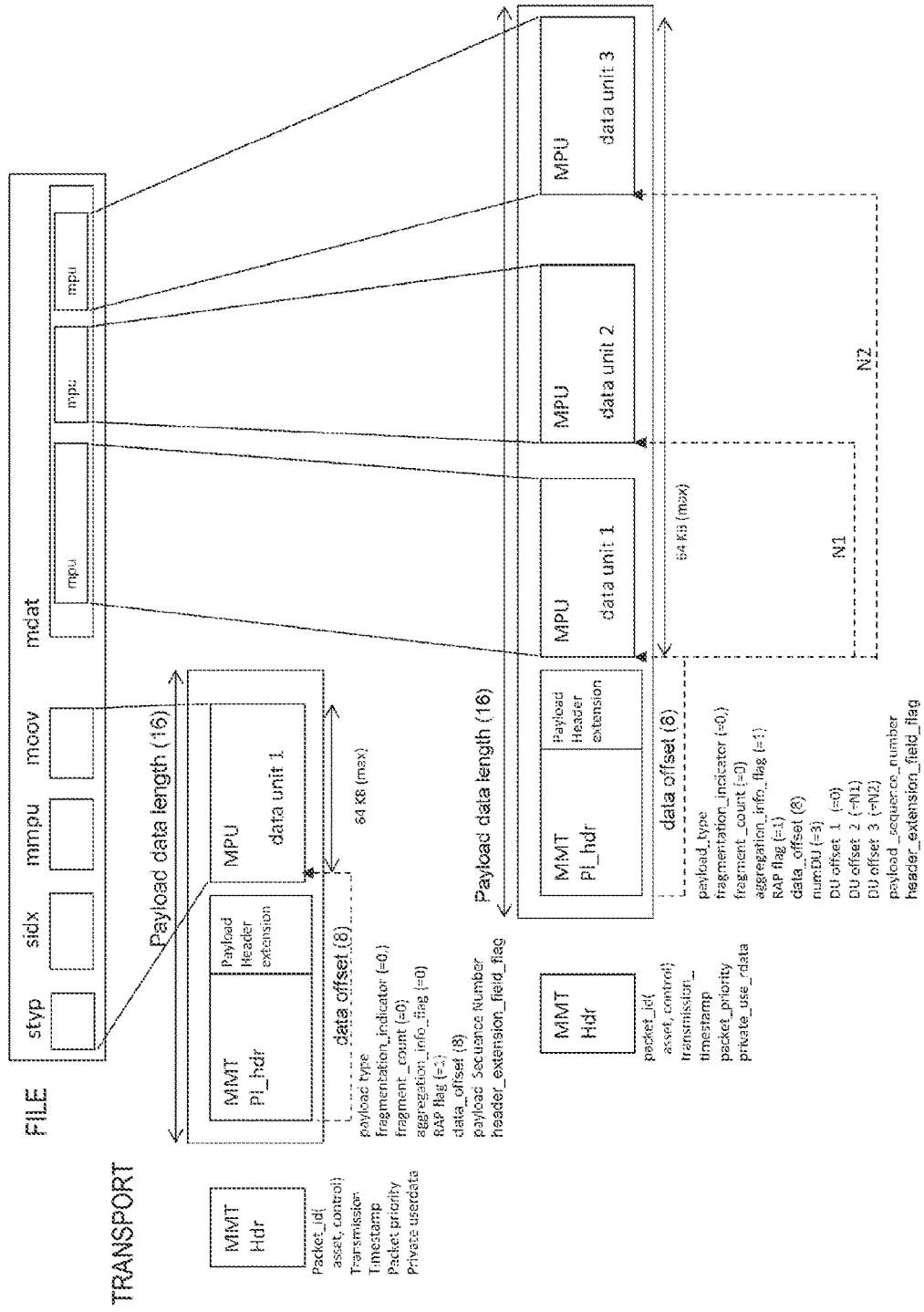
FIG. 4 is a diagram showing another example correspondence relationship between an MMT file and MMT packets actually delivered.
Figure 5:
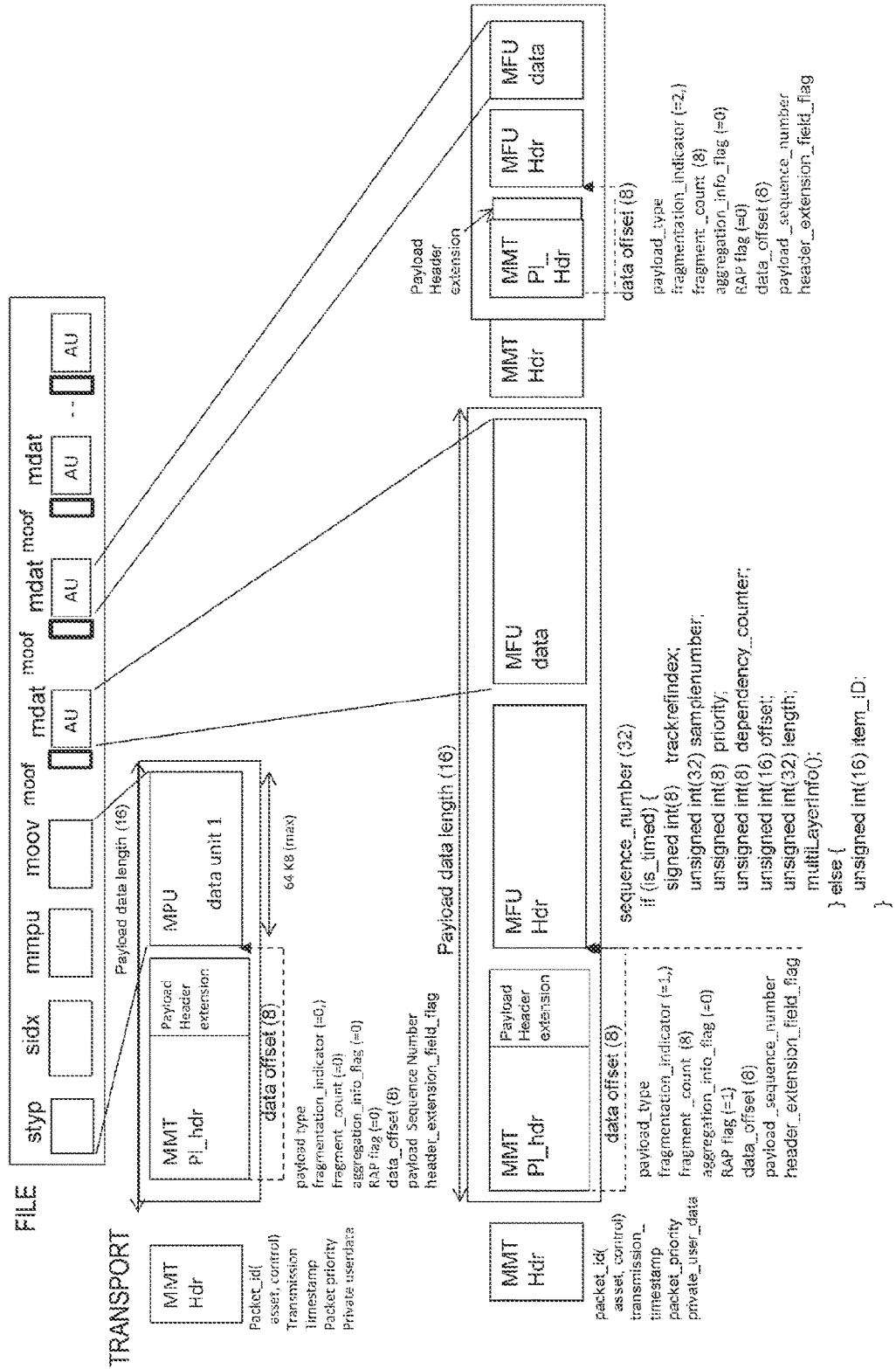
FIG. 5 is a diagram showing still another example correspondence relationship between an MMT file and MMT packets actually delivered.

FIG. 3, FIG. 4, and FIG. 5 show an example correspondence relationship between an MMT file and MMT packets that are actually delivered. As described above, the MMT file has boxes, such as "styp," "sidx," "mmpu," "moov," "moof," "mdat," and the like.

An MMT packet includes an MMT packet header (MMT Hdr) and an MMT payload. The MMT header contains a packet ID (packet_id), a packet sequence number (packet_sequence_number), a transmission timestamp (transmission_timestamp), a transmission priority (transmission_priority), private user data (private_user_data), and the like.

The packet ID is an identifier for identifying a video or audio asset, or a control message. The packet sequence number is a number indicating the order of packets. The transmission timestamp is a type stamp for transmission, i.e., time when an MMT packet is output from a transmitter.

The transmission priority is the level of priority that is an indicator for determining which MMT packet is passed with priority when the bandwidth of a transmission channel becomes narrow. The private user data is data that may be privately inserted by a user for a certain broadcasting application. The MMT payload includes an MMT payload header (MMT Pl_hdr) and MMT payload data. The MMT payload header may contain a payload header extension.

The MMT payload header contains a payload length, a payload type, a fragment type (fragmentation_indicator), a fragment count (fragment_count), aggregation info-flag (aggregation_info_flag), an RAP flag (random_access_point_flag), and the like.

Also, the MMT payload header contains a data offset (data_offset), a data unit number (numDU), a data unit offset (DU_offset), a payload sequence number (payload_sequence_number), a header extension field flag (header_extension_field_flag), and the like.

The payload length is size information of the entire payload. The payload type is information indicating whether the payload is of MPU or control nature (message). One payload can contain data of up to 64 kbytes. The fragment type is information indicating whether or not one payload can accommodate a complete MPU.

For example, if a complete MPU is accommodated, "0" is inserted. Otherwise, i.e., if an MPU is fragmented into a predetermined number of MFUs, one of "1," "2," and "3" is inserted. The value "1" indicates that the MMT packet contains the first fragment. The value "2" indicates that the MMT packet contains an intermediate fragment, but not the first or last fragment. The value "3" indicates that the MMT packet contains the last fragment.

The fragment count is count information of MFUs. The aggregation info-flag is flag information indicating whether or not the payload contains a plurality of MPUs. The value "0" indicates that the payload contains only one MPU. The value "1" indicates that the payload contains a plurality of MPUs. The RAP flag is information indicating whether or not the MMT packet contains a random access point, i.e., an access unit corresponding to the head picture of a GOP.

The data offset is information indicating a size from the head position of the payload to the head position of the payload data, i.e., the size of the payload header. The data unit number indicates the number of MPU data units contained in the payload. The data unit offset is offset information from the head position of payload data in each data unit. The payload sequence number is the payload sequence number of the MMT packet. The header extension field flag is flag information indicating whether or not a payload header extension is present.

FIG. 3 shows example MMT packetization. The meta-data of each of the boxes "styp," "sidx," "mmpu," "moov," and "moof" of an MMT file is inserted in one MPU data unit of an MMT payload to generate an MMT packet. In this case, in the MMT payload header, the "fragmentation_indicator" is "0," the "fragment_count" is "0," the "aggregation_info_flag" is "0," and the "RAP flag" is "1."

Also, in this case, one MPU that is present in the "mdat" of the MMT file is inserted in one MPU data unit of an MMT payload to generate an MMT packet. In this case, in the MMT payload header, the "fragmentation_indicator" is "0," the "fragment_count" is "0," the "aggregation_info_flag" is "0," and the "RAP_flag" is "1."

FIG. 4 shows another example MMT packetization. In this case, as in the example of FIG. 3, the meta-data of each of the boxes "styp," "sidx," "mmpu," and "moov" of an MMT file is inserted in one MPU data unit of an MMT payload to generate an MMT packet. Also, in this case, in a plurality of (in this example, three) MPU data units of the MMT payload, three MPUs that are present in the "mdat" of the MMT file are inserted to generate an MMT packet. In this case, in the MMT payload header, the "fragmentation_indicator" is "0," the "fragment_count" is "0," the "aggregation_info_flag" is "1," the "RAP_flag" is "1," the "numDU" is 3," and three "DU offsets" are present.

FIG. 5 shows still another example MMT packetization. In this case. In this case, as in the example of FIG. 3, the meta-data of each of the boxes "styp," "sidx," "mmpu," "moov," and "moof" of an MMT file is inserted in one MPU data unit of an MMT payload, or predetermined information conversion is performed, to generate an MMT packet.

Also, in this case, one access unit (AU) that is present in the "mdat" of the MMT file, as well as an MFU header (MFU Hdr), are inserted in one MPU data unit of an MMT payload to generate an MMT packet. In this case, in the MMT payload header, the "fragmentation_indicator" is "1," the "fragment_count" is "N" that is the count value of MFUs, the "aggregation_info_flag" is one of "1" to "3," depending on an MFU that is contained, and the "RAP_flag" is "1" or "0." Note that the MFU header contains information, such as the sequence number (sequence_number) of the MFU.

Figure 6:
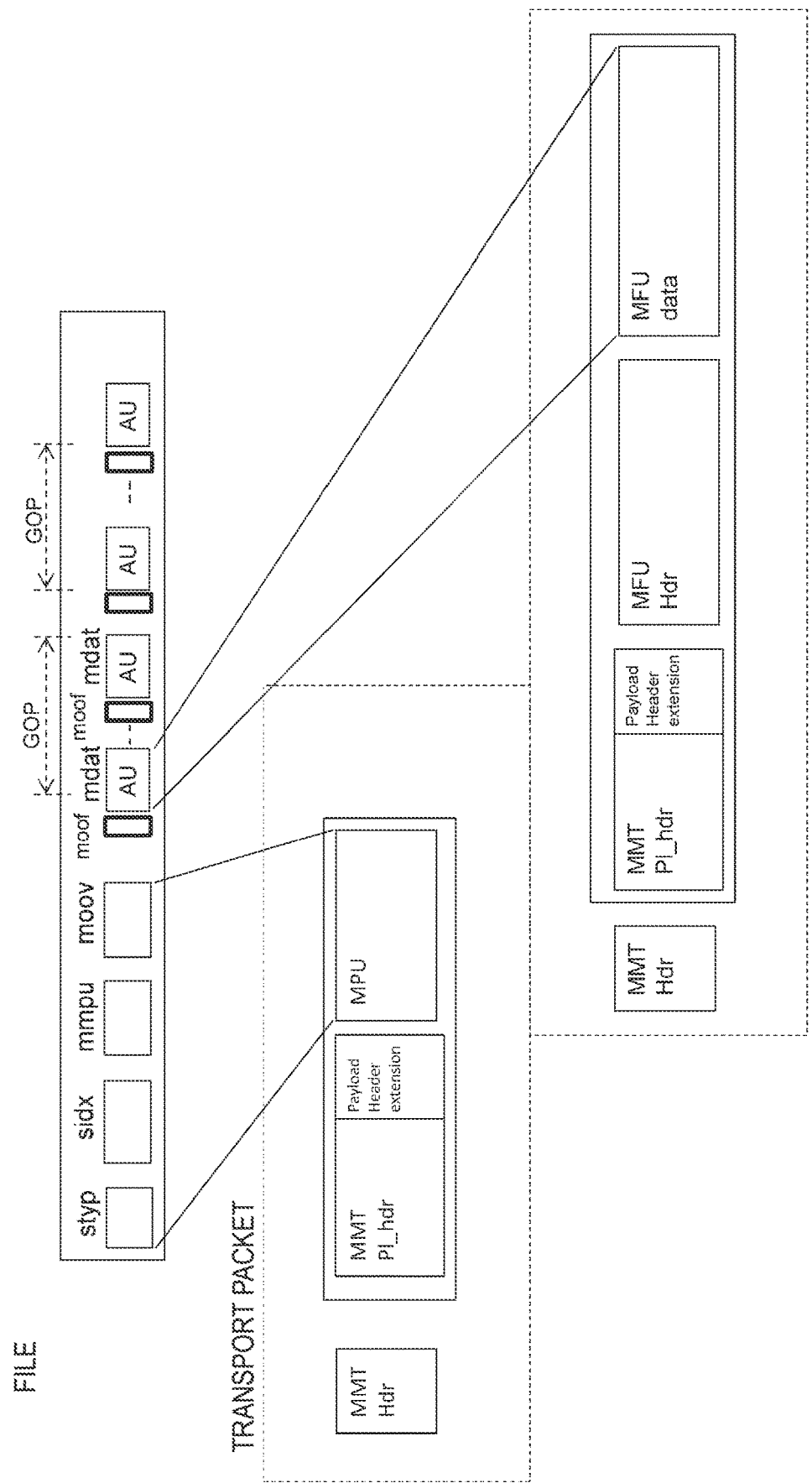
FIG. 6 is a diagram for describing a case where an MMT packet containing an MFU which is a fragment is a transport packet, and the MMT packet is the head packet (the head of GOP) of random access.
Figure 8:
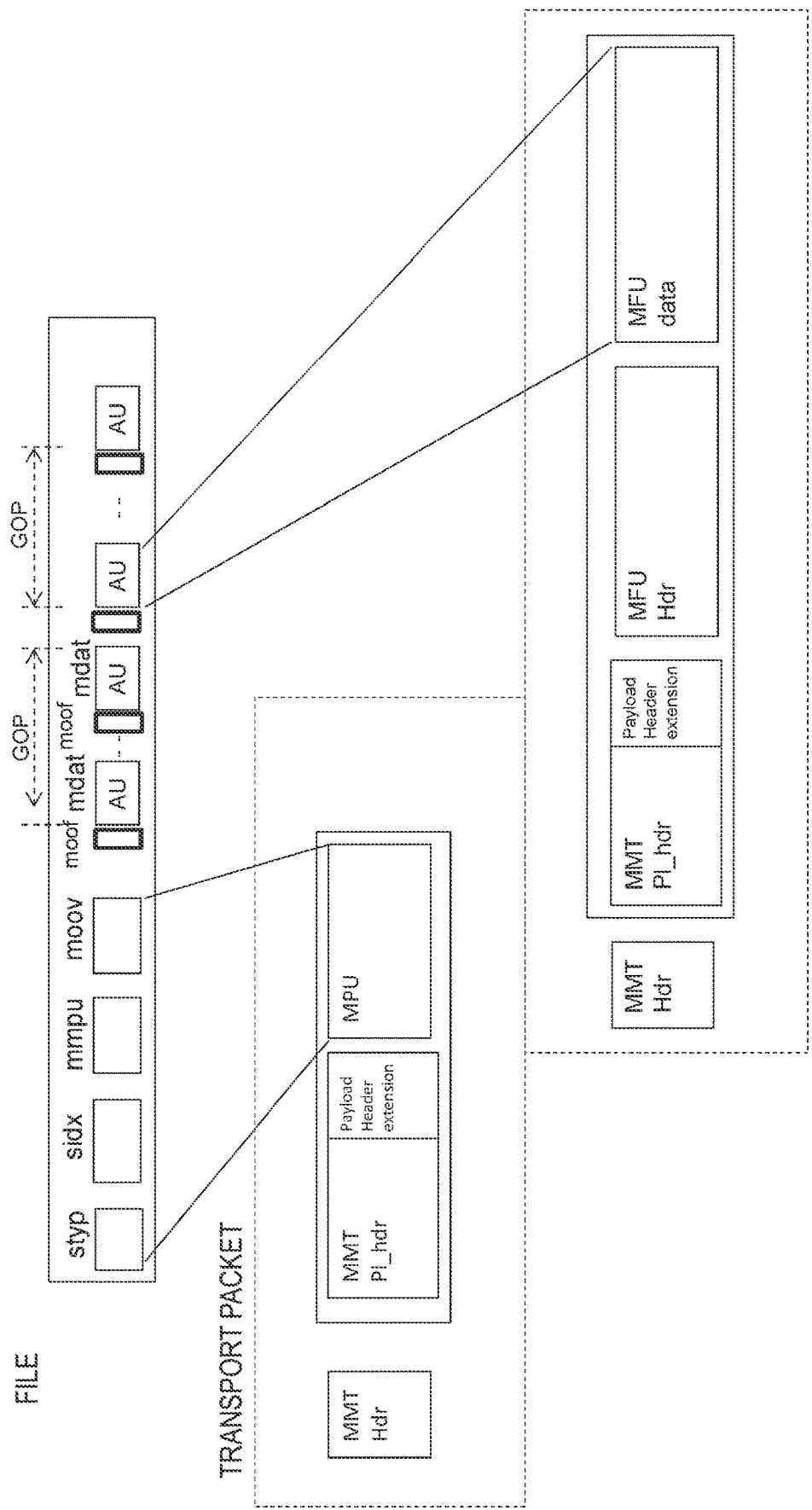
FIG. 8 is a diagram for describing a case where an MMT packet containing an MFU which is a fragment is a transport packet, and the MMT packet is the head packet (the head of GOP) of random access.

FIG. 6 and FIG. 8 show a case where an MMT packet containing an MFU obtained by fragmentation is a transport packet, and the MMT packet is the head packet (the head of a GOP) of random access. In this case, this MMT packet is delivered together with an MMT packet in which the meta-data of each of the boxes "styp," "sidx," "mmpu," "moov," and "moof" of an MMT file is inserted, or predetermined information conversion is performed.

For example, the "mmpu" area contains information for determining whether or not the data of an MFU is real-time data. This determination information allows a receiver to, at the head of random access, determine whether or not the data of an MFU is real-time data, for example.

Figure 7:
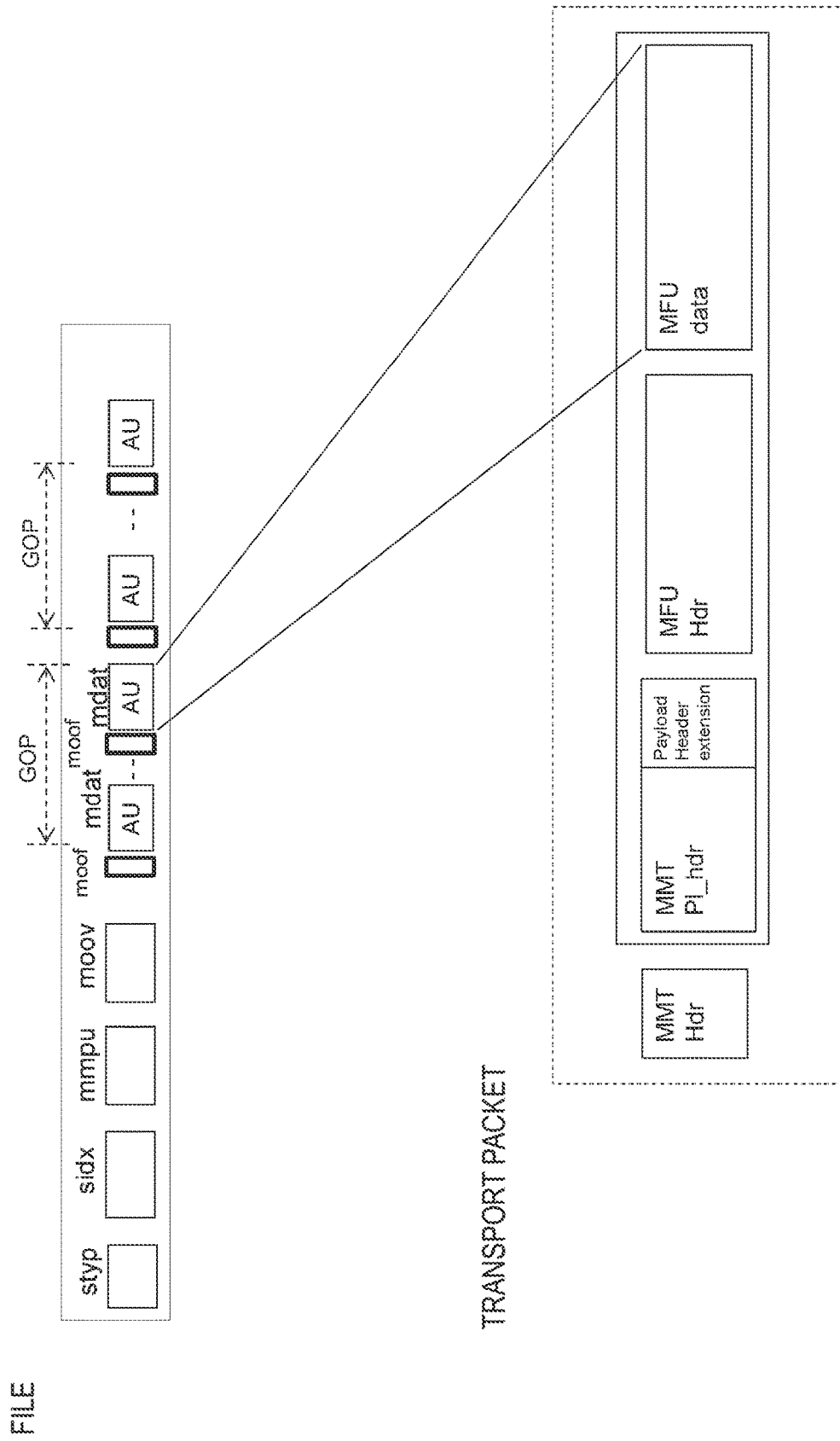
FIG. 7 is a diagram for describing a case where an MMT packet containing an MFU which is a fragment is a transport packet, and the MMT packet is a non-head packet of random access.

FIG. 7 shows a case where an MMT packet containing an MFU obtained by fragmentation is a transport packet, and the MMT packet is a non-head packet of random access. In this case, this MMT packet is delivered as an MMT packet having a minimum configuration unlike the above head packet.

Figure 9:
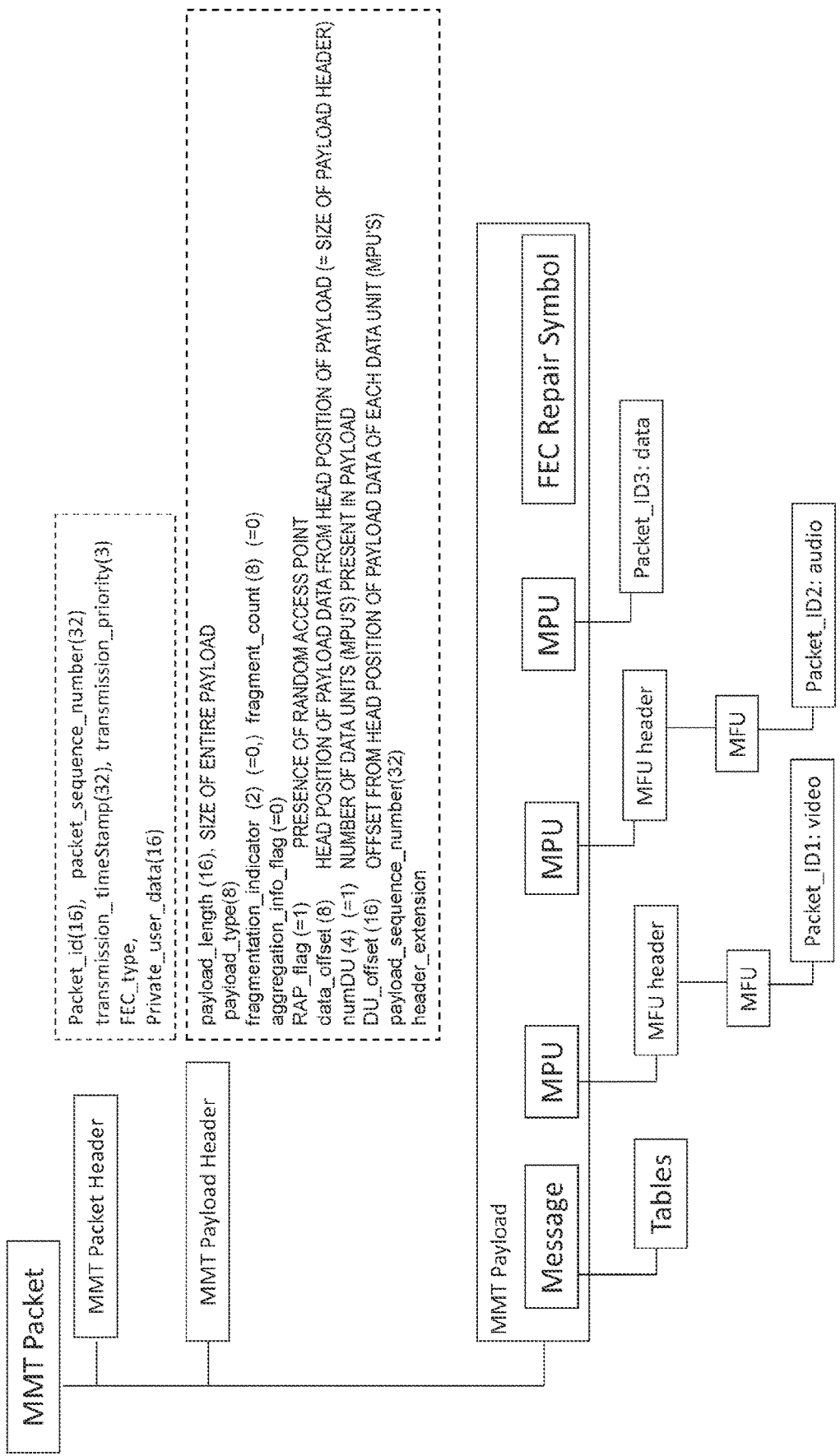
FIG. 9 is a diagram showing a configuration of an MMT packet in a tree form.

FIG. 9 shows a configuration of an MMT packet in a tree form. As described above, an MMT packet includes an MMT packet header, an MMT payload header, and an MMT payload. The MMT payload contains a message, a media processing unit (MPU), an FEC repair symbol, and the like. Signaling of these is performed based on a payload type (payload_type) contained in the MMT payload header.

Note that various message contents are inserted in a message in a table form. Also, an MPU may be fragmented and divided into MMT fragment units (MFUs). In this case, an MFU header is added to the head of each MFU. In the MMT payload, an MPU related to media data, such as video or audio, and in addition, an MPU related to meta-data, are present. An MMT packet containing each MPU can be identified using a packet ID (Packet_ID) present in the MMT packet header.

[Concept of Transmission Apparatus and Reception Apparatus]

Figure 10:
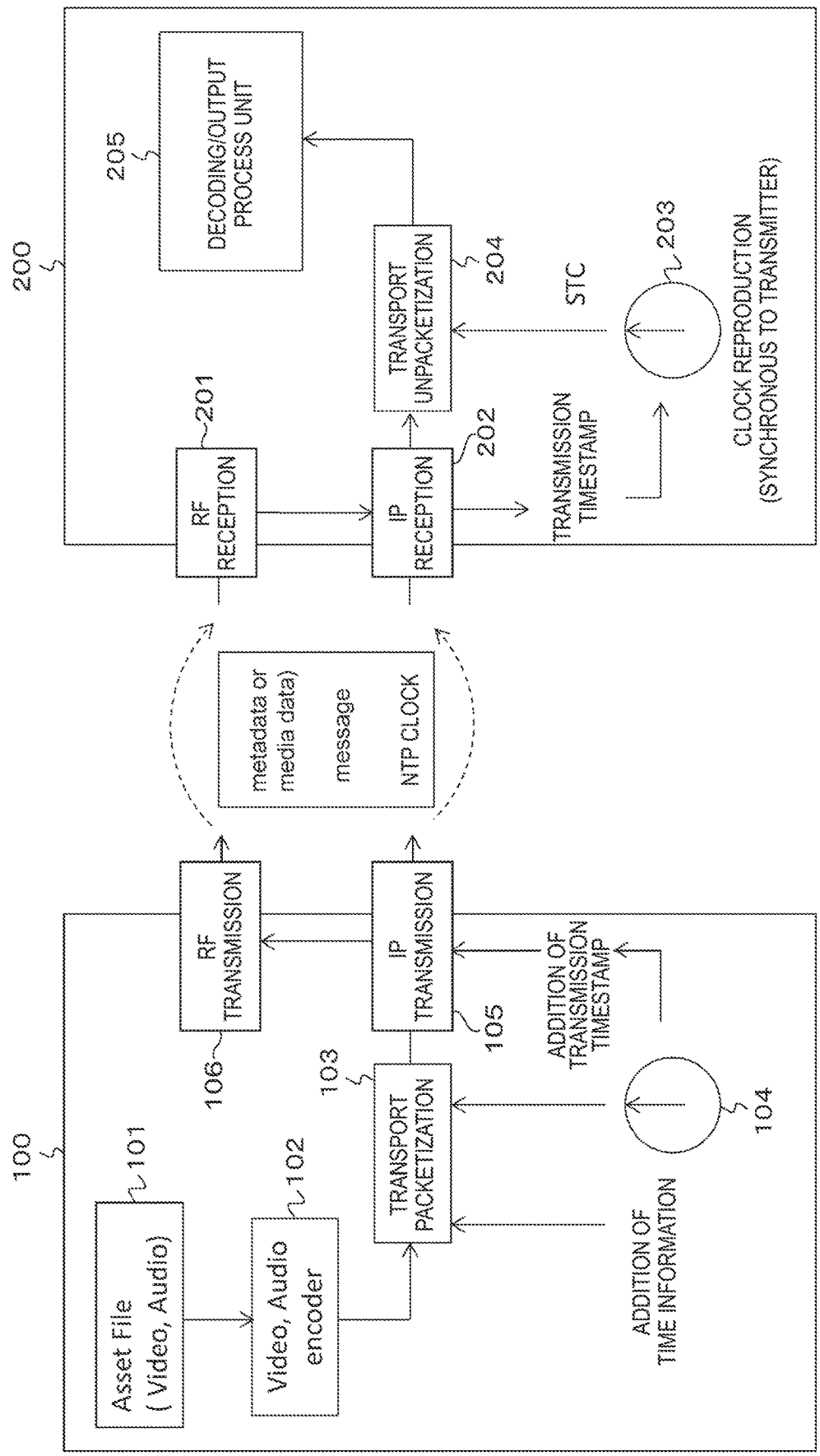
FIG. 10 is a conceptual diagram of a transport packet transmission apparatus and a transport packet reception apparatus.

FIG. 10 is a conceptual diagram of a transport packet transmission apparatus 100 and a transport packet reception apparatus 200. The transmission apparatus 100 includes an asset generation unit 101, an encoder 102, a transport packetization unit 103, a clock generation unit 104, an IP transmission unit 105, and an RF transmission unit 106.

The asset generation unit 101 generates video or audio data as media data. The asset generation unit 101 may be a data storage including a hard disk drive (HDD), semiconductor memory, or the like, or alternatively, a video camera, microphone, or the like. The encoder 102 performs an encoding process on video or audio data generated by the asset generation unit 101 to generate transmission data.

The transport packetization unit 103 generates an MMT packet containing media data in which the transmission data generated by the encoder 102 is inserted in the payload in MPU units or MFU units that are fragments of an MPU unit, and also generates the above MMT packet containing meta-data or the above MMT packet containing a message. The transport packetization unit 103, when generating an MMT packet, inserts time information for allowing a receiver to obtain decoding time (Decode_Timestamp) and presentation time (Display_Timestamp) into the MMT packet. The insertion of the time information into an MMT packet will be described in detail below.

The IP transmission unit 105, when using a communication network transmission channel, converts a transport stream including MMT packets successively output from the transport packetization unit 103 into IP packets, and transmits the IP packets to a receiver through the communication network transmission channel. The RF transmission unit 106, when using an RF transmission channel, performs RF modulation on a transport stream including MMT packets successively output from the transport packetization unit 103 through an appropriate adaptation layer or the like, and transmits the resultant transport stream to a receiver through the RF transmission channel. Here, the transmission apparatus 100 adds a transmission timestamp to transmission data based on a system time clock STC output from the clock generation unit 104.

The reception apparatus 200 has an RF reception unit 201, an IP reception unit 202, a clock reproduction unit 203, a transport unpacketization unit 204, and a decoding/output process unit 205.

The RF reception unit 201 receives a transport stream that is a succession of MMT packets transmitted from a transmitter through an RF transmission channel after analysis of the adaptation layer, and outputs the transport stream to the transport unpacketization unit 204. Also, the IP reception unit 202 receives a transport stream that is a succession of MMT packets transmitted from a transmitter through a communication network transmission channel, and outputs the transport stream to the transport unpacketization unit 204.

The clock generation unit 203 generates and supplies a system time clock STC to the transport unpacketization unit 204 or the like. The clock generation unit 203 sets a clock based on a transmission timestamp value (NIP value) added to transmission data. Alternatively, the clock generation unit 203 sets a clock based on a timestamp value (NTP value) supplied using an NTP packet. In this case, the clock generation unit 203 corrects a generated system time clock STC so that a difference between the generated system time clock STC and a type stamp value (NIP value) falls within a certain range.

Figures 11, 12:
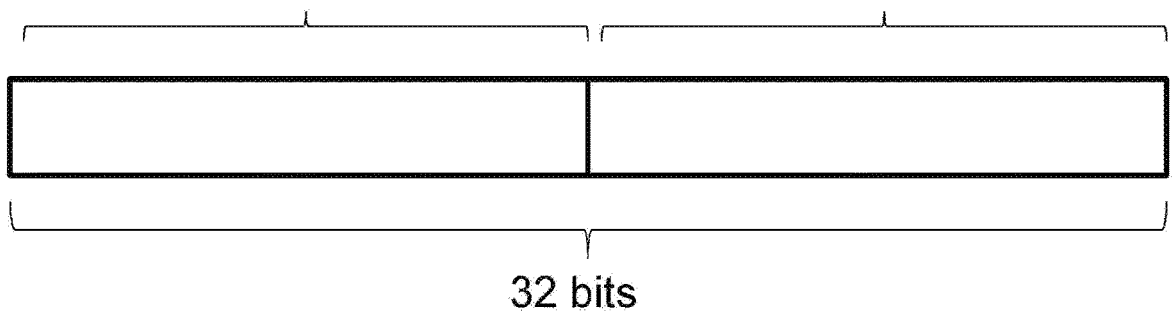
FIG. 11 is a diagram showing an "NTP short format."
FIG. 12 is a diagram for describing time information in a case where media data is video and an initial value is decoding time.

When NTP is supplied using an NTP packet obtained from an NTP server or the like, instead of a transmission timestamp of an MMT packet header, the format of NTP is not limited to an "NTP short format" shown in FIG. 11. Although not shown, NTP may be supplied in an 64-bit "NTP timestamp format (32 bits for the integer part of second+32 bits for the fractional part of second)" (see IETF RFC 5905). In this case, in a receiver, the decoder clock is set using the value of the received NTP, and is compared with the timestamp value of media. In this case, a difference in precision between the timestamp of presentation or decoding of media and the receiver's clock is taken into account in the receiver during the comparison.

The transport unpacketization unit 204 performs unpacketization on MMT packets successively supplied from the RF reception unit 201 or the IP reception unit 202 to obtain reception data as media data, and in addition, meta-data or a message. The decoding/output process unit 205 decodes the reception data obtained by the transport unpacketization unit 204 to obtain video or audio data, and performs video display or audio output based on the meta-data or message.

In this case, the decoding/output process unit 205 obtains decoding time (Decode_Timestamp) and/or presentation time (Display_Timestamp) for each access unit based on the time information extracted by the transport unpacketization unit 204, and controls decoding timing and presentation timing, to achieve synchronous reproduction of video and audio. This video and audio synchronous reproduction will be described in detail below.

Operations of the transmission apparatus 100 and the reception apparatus 200 shown in FIG. 10 will be briefly described. Firstly, an operation of the transmission apparatus 100 will be described. Video or audio data generated by the asset generation unit 101 is supplied to the encoder 102. Thereafter, the encoder 102 performs an encoding process on the video or audio data to generate transmission data (encoded data).

The transmission data generated by the encoder 102 is supplied to the transport packetization unit 103. Thereafter, the transport packetization unit 103 generates an MMT packet containing media data in which the transmission data is inserted in the payload in MPU units or MFU units that are fragments of an MPU unit, and in addition, the above MMT packet containing meta-data or the above MMT packet containing a message.

A transport stream including MMT packets successively generated by the transport packetization unit 103 is supplied to the IP transmission unit 105 or the RF transmission unit 106. The IP transmission unit 105, when using a communication network transmission channel, converts the transport stream into IP packets, and transmits the IP packets to a receiver through the communication network transmission channel. Also, the RF transmission unit 106, when using an RF transmission channel, performs RF modulation on the transport stream, and transmits the resultant transport stream to a receiver through the RF transmission channel. In this case, a transmission timestamp is added to transmission data based on the system time clock STC output from the clock generation unit 104.

Next, an operation of the reception apparatus 200 will be described. A transport stream transmitted from a transmitter is received by the RF reception unit 201 or the IP reception unit 202, so that the transport stream containing a succession of MMT packets is obtained. This transport stream is supplied to the transport unpacketization unit 204. The transport unpacketization unit 204 performs unpacketization on the MMT packets to obtain reception data as media data, and in addition, meta-data or a message, and also time information or the like. These pieces of data or information are supplied to the decoding/output process unit 205.

The decoding/output process unit 205 decodes the reception data obtained by the transport unpacketization unit 204 to obtain video or audio data, and performs video display or audio output based on meta-data or a message. In this case, time information extracted from MMT packets by the transport unpacketization unit 204 is supplied to the decoding/output process unit 205. Thereafter, based on the time information, the decoding/output process unit 205 obtains the decoding time (Decode_Timestamp) and/or presentation time (Display_Timestamp) of each access unit, and controls decoding timing and output timing, to achieve simultaneous reproduction of video and audio.

[Time Information Inserted in MMT Packet]

Next, time information inserted in an MMT packet will be described. As described above, the time information is information for allowing a receiver to obtain decoding time (Decode_Timestamp) and/or presentation time (Display_Timestamp). Media data contained in an MMT packet includes one or more access units. The time information inserted in an MMT packet is time information and/or information for obtaining presentation time each of which corresponds to each of the one or more access units.

For example, in a first technique, the time information inserted in an MMT packet contains an initial value, i.e., a value of decoding time or presentation time corresponding to the initial access unit of the one or more access units. Also, the time information contains an offset value from decoding time to presentation time each of which corresponds to each access unit. Also, for example, in a second technique, the time information inserted in an MMT packet contains presentation time itself, or presentation time and decoding time themselves.

The first technique will be described. The offset value is a relative offset value corresponding to an absolute offset value. Therefore, conversion information for converting the relative offset value into the absolute offset value is added to the time information. The conversion information contains "timestamp_type," "time tick," "au_rate_scale," "division_factor," and the like.

The "timestamp_type" is information indicating whether the initial value is the initial value of decoding time or the initial value of presentation time. The "time tick" is information indicating what clock is used for control. This information indicates that all is controlled using a clock of 90 kHz, for example. The "au_rate_scale" is scale information for calculating the rate of video or audio access units. Note that the conversion information also contains flag information "Asset_type" indicating whether media data is video or audio.

For example, in the case of video, if the above "time_tick" indicates 90 kHz, the "au_rate_scale" has a value of 1500, 1800, 3000, 3600, or the like. By dividing 90 kHz by the respective values, a video rate of 60 Hz, 50 Hz, 30 Hz, 25 Hz, or the like can be calculated.

Also, the "division_factor" is a factor for finely adjusting the rate. For example, in the case of NTSC video, the "division_factor" is a value for adjusting the rate to 30 Hz or 29.94 Hz, i.e., is "1" or "1.001."

Here, a case where the media data is video and the initial value is decoding time will be described. FIG. 12 indicates an example correspondence relationship between decoding times "DTS(n)," offset values "DLT(n)," and presentation times "PTS(n)" that correspond to the zeroth to sixth access units (AUs). In this example, an offset value (dlt_time) from the initial value of decoding time to the initial value of presentation time is "1," which is a relative offset value.

Here, the zeroth access unit is an I picture, the initial access unit is a P picture, the second access unit is a B picture, the third access unit is a B picture, the fourth access unit is a P picture, the fifth access unit is a B picture, and the sixth access unit is a B picture. Therefore, decoding times are reordered to obtain presentation times.

In this case, the time information inserted and transmitted in an MMT packet is TS0 (here, TS0=0) that is the initial value of decoding time, and the relative offset values DLT(n). Note that, in FIG. 12, the "Time" indicates time for each access unit using a relative value.

When such time information is transmitted to a receiver, the receiver can calculate the decoding time and presentation time of each access unit using the conversion information as follows. In this case, the initial value TS0 is the decoding time DTS(0) of the initial access unit. The offset time (dlt_time) from the initial value ISO is calculated by Expression (1) below. For example, as a typical example, when the au_rate_scale=1500 and the division_factor=1.001, the dlt_time=1500*1.001.

$$dlt\_time = au\_rate\_scale * division\_factor \quad (1)$$

The decoding times DTS(n) of the subsequent access units are calculated by adding a value obtained by dividing the offset time (dlt_time) by the "time_tick" to the immediately previous decoding time DTS(n−1) as shown in Expression (2) below. Note that DTS(0)=TS0.

$$DTS(n) = dlt\_time/time\_tick + DTS(n-1) \quad (2)$$

Also, as shown in Expression (3) below, the presentation time PTS(n) of each access unit is calculated by adding a value obtained by multiplying the offset value DLT(n) by the "dlt_time/time_tick" to the decoding time DTS(n).

$$PTS(n) = DLT(n) * (dlt\_time/time\_tick) + DTS(n) \quad (3)$$

Figure 13:
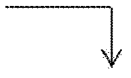
FIG. 13 is a diagram for describing time information in a case where media data is video and an initial value is presentation time.

Next, a case where the media data is video and the initial value is presentation time will be described. FIG. 13 indicates an example correspondence relationship between decoding times "DTS(n)," offset values "DLT(n)," and presentation times "PTS(n)" that correspond to the zeroth to sixth access units (AUs), which is similar to that of FIG. 12. In this example, an offset value (dlt_time) from the initial value of decoding time to the initial value of presentation time is "1." Also in this case, decoding times are reordered to obtain presentation times.

In this case, the time information inserted and transmitted in an MMT packet is TS0 (here, TS0=1) that is the initial value of presentation time, and the relative offset values DLT(n). Note that, in FIG. 13, "Time" indicates time for each access unit using a relative value.

In a case where such time information is transmitted to a receiver, the receiver can calculate the decoding time and presentation time of each access unit using the conversion information as follows. In this case, the initial value ISO is the presentation time PTS(0) of the initial access unit. Therefore, as shown in Expression (4) below, the decoding time DTS(0) of the initial access unit is calculated by subtracting, from PTS(0), a value obtained by multiplying a value obtained by dividing the offset time (i.e., the "dlt_time") by the "time_tick" by the offset value DLT(n).

$$DTS(0)=PTS(0)-(dlt\_time/time\_tick)*DLT(n) \quad (4)$$

Here, as shown in Expression (5) below, the "dlt_time" is calculated by multiplying the "au_rate_scale" by the "division_factor."

$$dlt\_time=au\_rate\_scale*division\_factor \quad (5)$$

The decoding times DTS(n) of the subsequent access units are calculated by adding a value obtained by dividing the offset time (dlt_time) by the "time_tick" to the immediately previous decoding time DTS(n−1) as shown in the following expression (6).

$$DTS(n)=dlt\_time/time\ tick+DTS(n-1) \quad (6)$$

Also, the presentation time PTS(n) of each access unit is calculated by adding a value obtained by multiplying the offset value DLT(n) by the "dlt_time/time_tick" to the decoding time DTS(n) as shown in the following expression (7).

$$PTS(n)=DLT(n)*(dlt\_time\ time\_tick)+DTS(n) \quad (7)$$

Figure 14:
FIG. 14 is a diagram for describing time information in a case where media data is audio and an initial value is decoding time.

Next, a case where the media data is audio and the initial value is decoding time will be described. FIG. 14 indicates an example correspondence relationship between decoding times "DTS(n)," offset values "DLT(n)," and audio output times "PTS(n)" that correspond to the zeroth to sixth access units (AUs). In this example, the "dlt_time/time_tick" is "1."

Note that an audio access unit is a set of a plurality of audio samples. Here, as shown in Expression (8) below, the "dlt_time" is calculated by multiplying the "au_rate_scale" by the "division_factor." For example, as a typical example, when the audio sampling frequency is 44.1 KHz and the audio encoding scheme uses 1024 samples as one audio access unit, the au_rate_scale=2089.8, the division_factor=1, and the dlt_time=2089.8*1.

$$dlt\_time=au\_rate\_scale*division\_factor \quad (8)$$

In this case, the time information inserted and transmitted in an MMT packet is TS0 (here, TS0=0) that is the initial value of audio output time, and the relative offset values DLT(n). Note that, in FIG. 14, the "Time" indicates time for each access unit using a relative value. In a normal case, after being decoded, the time information is transferred to a buffer directly without reordering, and therefore, DLT(n) indicating a difference between the decoding time DTS(n) and the audio output time PTS(n) is "0."

When such time information is transmitted to a receiver, the receiver can calculate the decoding time and audio output time of each access unit using the conversion information as follows. In this case, the initial value TS0 is the audio output time PTS(0) of the initial access unit, and is also directly the decoding time DTS(0) of the initial access unit.

The decoding times DTS(n) and audio output times PTS(n) of the subsequent access units are calculated by adding a value obtained by dividing the offset time (dlt_time) by the "time_tick" to the immediately previous audio output time PTS(n−1) as shown in Expression (9) below. Note that PTS(0)=TS0.

$$PTS(n)=DTS(n)=(dlt\_time/time\_tick)+PTS(n-1) \quad (9)$$

[Example Configuration of Decoding/Output Process Unit of Reception Apparatus]

Figure 15:
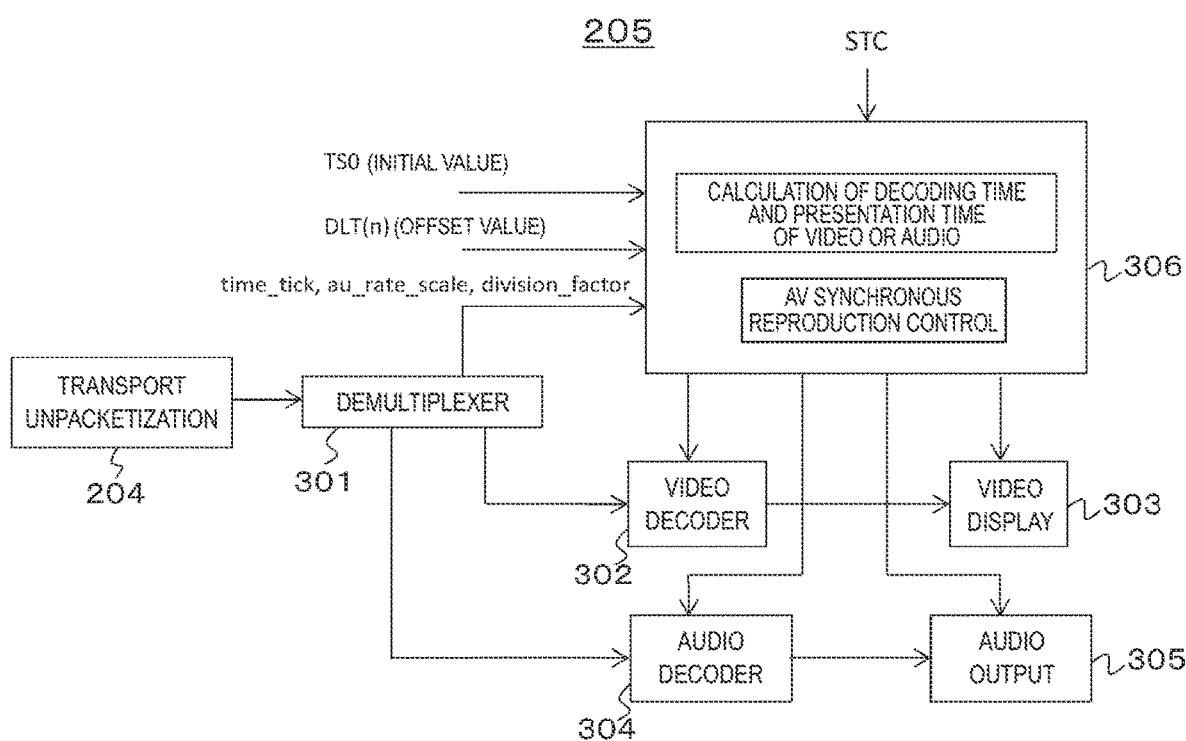
FIG. 15 is a block diagram showing an example configuration of a decoding/output process unit.

The decoding/output process unit 205 of the reception apparatus 200 will be further described. FIG. 15 shows an example configuration of the decoding/output process unit 205. The decoding/output process unit 205 has a demultiplexer 301, a video decoder 302, a video display unit 303, an audio decoder 304, an audio output unit 305, and a control unit 306.

The demultiplexer 301 extracts various kinds of information or data from an output of the transport unpacketization unit 204. Specifically, the demultiplexer 301 extracts encoded video data of each video access unit, and also extracts encoded audio data of each audio access unit.

Also, the demultiplexer 301 extracts time information for obtaining the decoding time DTS(n) and presentation time (audio output time) PTS(n) of each video or audio access unit. As described above, this time information contains the initial value TS0 and the relative offset values DLT(n).

Also, the demultiplexer 301 extracts various kinds of information (conversion information) for converting the relative offset value DLT(n) into the absolute offset value. As described above, this conversion information contains the "timestamp_type," "time_tick," "au_rate_scale," "division_factor," and the like.

The video decoder 302 performs a decoding process on the encoded video data of each video access unit extracted by the demultiplexer 301 to obtain decoded video data of each access unit. The video display unit 303 performs video display (image display) based on the decoded video data of each access unit obtained by the video decoder 302.

The audio decoder 304 performs a decoding process on the encoded audio data of each audio access unit extracted by the demultiplexer 301 to obtain decoded audio data of each access unit. The audio output unit 305 performs audio output (sound output) based on the decoded audio data of each access unit obtained by the audio decoder 304.

The control unit 306 calculates the decoding time DTS(n) and presentation time (audio output time) PTS(n) of each video or audio access unit based on the time information and conversion information extracted by the demultiplexer 301. Thereafter, the control unit 306 performs a synchronous reproduction control on audio or video as follows.

Specifically, the control unit 306 controls the decoding timing and presentation timing of each video access unit based on the decoding time DTS(n) and presentation time PTS(n) of each access unit. In this case, the control unit 306 controls the video decoder 302 so that the video decoder 302 starts decoding each access unit at a timing when the system clock SIC generated by the clock generation unit 203 (see FIG. 7) indicates the decoding time DTS(n). Also, the control unit 306 controls the video display unit 303 so that the video display unit 303 starts video display using each access unit at a timing when the system clock STC indicates the presentation time PTS(n).

Also, the control unit 306 controls the decoding timing and presentation timing of each audio access unit based on the decoding time DTS(n) and audio output time PTS(n) of each access unit. In this case, the control unit 306 controls the audio decoder 304 so that the audio decoder 304 starts decoding each access unit at a timing when the system clock STC indicates the decoding time DTS(n). Also, the control unit 306 controls the audio output unit 305 so that the audio output unit 305 starts audio output using each access unit at a timing when the system clock STC indicates the audio output time PTS(n).

An operation of the decode/output control unit 205 shown in FIG. 15 will be briefly described. An output of the transport unpacketization unit 204 is supplied to the demultiplexer 301. The demultiplexer 301 extracts encoded video data of each video access unit, and supplies the encoded video data to the video decoder 302.

The video decoder 302 performs a decoding process on the encoded video data of each video access unit to obtain decoded video data of each access unit. Thus, the decoded video data of each access unit is supplied to the video display unit 303. The video display unit 303 performs video display (image display) based on the video data of each access unit.

Also, the demultiplexer 301 extracts encoded audio data of each audio access unit, and supplies the encoded audio data to the audio decoder 304. The audio decoder 304 performs a decoding process on the encoded audio data of each audio access unit to obtain decoded audio data of each access unit. Thus, the decoded audio data of each access unit is supplied to the audio output unit 305. The audio output unit 305 performs audio output (sound output) based on the audio data of each access unit.

Also, the demultiplexer 301 extracts time information (the initial value TS0 and the relative offset values DLT(n)) for obtaining the decoding time DTS(n) and presentation time (audio output time) PTS(n) of each video or audio access unit. Moreover, the demultiplexer 301 extracts various kinds of conversion information for converting the relative offset value DLT(n) into the absolute offset value. These pieces of time information and conversion information are supplied to the control unit 306.

The control unit 306 calculates the decoding time DTS(n) and presentation time (audio output time) PTS(n) of each video or audio access unit based on the time information and the conversion information. Thereafter, the control unit 306 performs a synchronous reproduction control on audio or video based on the decoding time DTS(n) and the presentation time (audio output time) PTS(n).

In this case, the control unit 306 controls the decoding timing and presentation timing of each video access unit based on the decoding time DTS(n) and presentation time PTS(n) of each video access unit. Also, the control unit 306 controls the decoding timing and output timing of each audio access unit based on the decoding time DTS(n) and audio output time PTS(n) of each audio access unit.

Note that, in the foregoing description, a case where the time information inserted in an MMT packet is of the first technique, i.e., the time information is the initial value of decoding time or presentation time and the offset value corresponding to each access unit, has been described. Although not described in detail, there may be a case where the time information inserted in an MMT packet is of the second technique, i.e., the time information is the presentation time itself, or presentation time time and decoding time themselves, of each access unit. In this case, the control unit 306 uses these times directly.

FIGS. 16A-16E are timing charts showing an example AV synchronous reproduction control in the control unit 306. FIG. 16A shows a system clock STC generated by the clock generation unit 203. As described above, this system clock STC is set based on a transmission timestamp (NTP value) transmitted from a transmitter or a timestamp value (NTP value) supplied in an NTP packet.

As shown in FIG. 16B, each time the system clock STC indicates the decoding time DTS(n) of each video access unit, decoding of each video access unit is started. Thereafter, as shown in FIG. 16C, each time the system clock STC indicates the presentation time PTS(n) of each video access unit, video display (image display) of each video access unit is started.

As shown in FIG. 16D, each time the system clock STC indicates the decoding time DTS(n) of each audio access unit, decoding of each audio access unit is started, and audio output (sound output) is started. FIG. 16E shows audio sample output.

Note that if a packet that is an MFU fragment is dropped during transmission, or it is determined that such a packet is not used for presentation in the reception apparatus 200, the count of access units of a timestamp table that is reproduced in a receiver, and access units that are actually received, have a relationship shown in FIG. 17. Access units (AUs) as MFU data that are assorted according to the sequence number (sequence_number) of the MFU header, are checked on the timestamp table, and are transferred from a compression buffer to a decoder at the timing of DTS(n). Also, the access units are transferred from the decode buffer to a presentation process at the timing of PTS(n). Thus, it is determined whether or not a timestamp (Timestamp) is to be referenced with respect to an access unit that is not received or an access unit that it has been determined is not to be presented.

[Method for Generating Time Information when File is Converted into Transport Packets]

When a file state is converted into transport packets, time information (time information for allowing a receiver to obtain decoding time and/or presentation time) that is to be inserted in an MMT packet is generated based on information that is obtained from an MMT file as described below. The time information that is to be inserted in an MMT packet is generated from information in a file by the transport packetization unit 103.

Firstly, a case where "moon" information is used for an entire file will be described. In this case, the decoding times and presentation times of all samples contained in a file are supplied using boxes 'stts' and 'ctts' in the box "Moov." In this case, the decoding time is given by the box 'stts' (decoding time to sample). Also, a difference between the decoding time and the presentation time is given by the box 'ctts' (composition time to sample). Also, a sample position of random access is shown in a box 'stss' (sync sample table).

Next, a case where "moof" information is used for each fragment will be described. In this case, the decoding time and presentation time of a sample for each fragment are supplied using boxes 'trun' and 'tfra' in the box "Moof." In this case, an offset position from the head position of a fragment, and an offset between the decoding time and presentation time of a sample (the number of frames in the case of video, and the number of audio samples in the case of audio), are supplied using the box 'trun' (track fragment run). Also, a random access position and the decoding time of the sample are supplied using the box 'tfra' (track fragment random access). Also, a presentation time is known from a difference value between the decoding time and presentation time of each sample.

[Position where Time Information is Inserted]

Figure 18A:
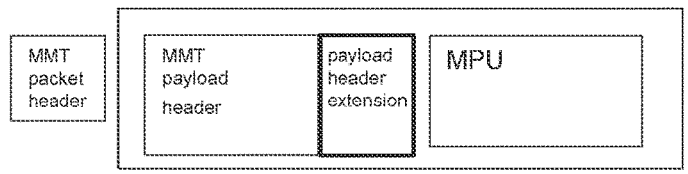
FIGS. 18A-18C are diagrams schematically showing an example method for inserting time information into an MMT packet.
Figure 18B:
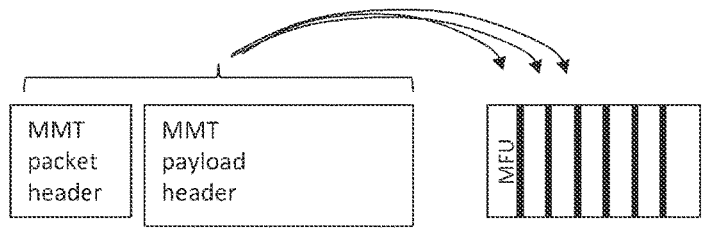
Figure 18C:
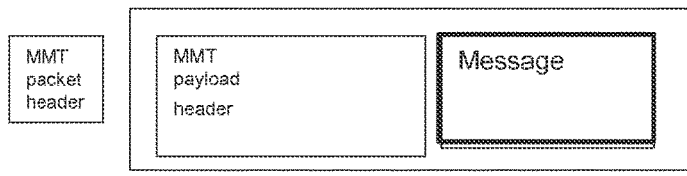

Next, a method for inserting time information will be described. FIGS. 18A-18C schematically show a method for inserting time information into an MIMI packet. FIG. 18A shows a case where time information is transmitted in an MPU payload header. In this case, if the payload of an MPU contains a plurality of access units (AUs), time information corresponding to the plurality of access units is inserted in a payload header extension. On the other hand, if a single access unit is provided in the payload of an MPU, time information is inserted in a payload header extension for each access unit.

FIG. 18B shows a case where time information is transmitted in an MPU payload for each access unit (AU) that is a fragment. In this case, a single access unit is provided in an MFU, and time information is inserted in an MFU header extension for each access unit. Alternatively, time information is inserted in an MFU payload for each access unit. Also, FIG. 18C shows a case where time information is transmitted in a message. In this case, at least, a message having time information for media related using a packet ID (packet_id) of interest is delivered in units of a random access point (RAP).

FIGS. 19A-19C show an example packet configuration in a case where time information (time information for allowing a receiver to obtain decoding time and/or presentation time) is inserted for each access unit in order to reduce a delay in transmission/reception. FIG. 19A shows an example packet configuration in a case where time information is inserted in an MMT payload header. FIG. 19B shows an example packet configuration in a case where time information is inserted in an MFU. Moreover, FIG. 19C shows an example packet configuration in a case where time information is inserted in an MMT message.

Note that, in each example packet configuration, if an MMT packet having an access unit of interest is the head packet of random access, i.e., a packet of a random access point, the MMT packet is delivered together with an NMI packet in which meta-data of each of the boxes "styp," "sidx," "mmpu," and "moov" of an MMT file is inserted. On the other hand, if this MMT packet is a non-head packet of random access, i.e., a packet of a non-random access point, an MMT packet in which the above meta-data is inserted is not delivered.

The case where time information is transmitted in the MPU payload header will be further described. FIG. 20 shows an example structure (syntax) of an entire MMT packet. The MMT packet (mmt_packet( )) contains an MMT packet header (mmtp_header( )) and an MMT payload (mmtp_payload( )). Moreover, the MMT payload contains an MMT payload header (mmtp_payload_header( )) and MMT payload data (mmtp_payload_data( )).

FIG. 21 shows an example structure (syntax) of the MMT packet header (mmtp_header( )). Although not described in detail, the MMT packet header contains, as described above, a packet ID (packet_id), a packet_sequence_number (packet_sequence_number), a transmission timestamp (transmission_timestamp), a transmission priority (transmission Priority), private user data (private user_data), and the like.

FIG. 22 shows an example structure (syntax) of the MMT payload header (mmtp_payload_header( )). Although not described in detail, the MMT payload header contains, as described above, a payload length (payload_length), a payload type (payload_type), a fragment type (fragment_type), a fragment count (fragment_count), an aggregation info-flag (aggregation_info_flag), an RAP flag (random_access_point_flag), a data offset (data_offset), a data unit number (numDU), a data unit offset (DU_offset), a payload sequence number (payload_seq_number), a header extension field flag (header_extension_field_flag), and the like.

Also, when the header extension field flag is "1," the MMT payload header further contains an MMT payload header extension (mmtp_payload_header_extension( )).

FIG. 23 shows an example structure (syntax) of the MMT payload header extension (mmtp_payload_header_extension( )). This example structure corresponds to a case where time information is transmitted in the MPU payload header. FIG. 24 shows semantics of major information in the example structure.

A "payload_header_extension_type," which is a 16-bit field, indicates the type of the MMT payload header extension. For example, "0x0001" indicates that time information (type stamp) for processing is provided. A "payload_header_extension_length," which is a 16-bit field, indicates the size of the MMT payload_header_extension. The "asset_type," which is a 2-bit field, indicates an asset type. For example, "01" indicates video, and "10" indicates audio.

A "time_tick," which is a 2-bit field, indicates what clock is used for control. The value "01" indicates a value of a clock of 90-kHz precision. The value "10" indicates the "NTP short time." An "au_rate_scale," which is a 3-bit field, indicates scale information for calculating the rate of video or audio access units.

If the asset type is video, "000" indicates a value of 3750, and the rate can be calculated from that value to be 24 Hz. Also, "001" indicates a value of 3600, and the rate can be calculated from that value to be 25 Hz. Also, "010" indicates a value of 3000, and the rate can be calculated from that value to be 30 Hz.

Also, "011" indicates a value of 1800, and the rate can be calculated from that value to be 50 Hz. Also, "100" indicates a value of 1500, and the rate can be calculated from that value to be 60 Hz. Also, "101" indicates a value of 900, and the rate can be calculated from that value to be 100 Hz. Also, "110" indicates a value of 750, and the rate can be calculated from that value to be 120 Hz. Note that "111" is reserved.

On the other hand, if the asset type is audio, "000" indicates a value of 1920, and the rate can be calculated from that value to be 48 KHz*1024. Also, "001" indicates a value of 2089.8, and the rate can be calculated from that value to be 44.1 KHz*1024. Also, "010" indicates a value of 2880, and the rate can be calculated from that value to be 32 KHz*1024. Note that the others are reserved.

A "division_factor," which is a 2-bit field, is a factor for finely adjusting the rate. If the asset type is video, "00" indicates 1, and "01" indicates 1.001. Also, if the asset type is audio, "00" indicates 1, and "01" indicates 2.

A "timestamp_type," which is a 1-bit field, is information indicating whether the initial value is the initial value of decoding time or the initial value of presentation time. The value "1" indicates decoding time (decode_timestamp), and the value "0" indicates presentation time (display_timestamp).

A "timestamp_for_processing," which is a 32-bit field, indicates the initial value. In this case, if the "time_tick" is "01," the timestamp is in 90-KHz precision. Also, if the "time_tick" is "10," the timestap is the "NTP short timestamp" defined in RFC5059.

An "au_count_in_mpu," which is a 10-bit field, indicates the number of access units (AUs) contained in an MPU. A "delta_sequence_type," which is a 1-bit field, indicates whether the offset value is a variable length code or an 8-bit fixed length. The value "1" indicates a variable length code, and "0" indicates an 8-bit fixed length. Note that variable length coding of the offset value will be described below.

A "delta_fixed_length_code," which is an 8-bit field, is an area where an offset value having an 8-bit fixed length is inserted. A "delta_variable_length_code," which is a variable length area, is an area where an offset value is inserted as a variable length code. Note that a "trailing_filler( )" is used to insert a 1-bit to 7-bit succession of "0" with respect to accumulation of the "delta_variable_length_code" when necessary for byte alignment of the size of the MMT payload_header_extension (mmtp_payload_header_extension( )).

Note that, by adding to the semantics of FIG. 24, the time_tick=60 Hz and the au_rate_scale=1 can be assigned in the case of video, and the time_tick=44.1 KHz and the au_rate_scale=1 can be assigned in the case of audio.

Note that, in the foregoing, an example structure corresponding to the first technique in which decoding time or presentation time, and an offset value, are inserted in the MMT payload header extension, has been illustrated. There may be another example structure corresponding to the second technique in which presentation time, or presentation time and decoding time, are inserted in the MMT payload header extension.

FIG. 25 shows an example structure (syntax) of the MMT payload header extension (mmtp_payload_header_extension( )) in that case. This example structure also corresponds to a case where time information is transmitted in the MPU payload header. FIG. 26 shows semantics of major information in the example structure.

A "payload_header_extension_type," which is a 16-bit field, shows the type of the MMT payload header extension. For example, "0x01" indicates that a presentation timestamp (presentation time) is supplied in the NTP short time format. The value "0x02" indicates that a presentation timestamp and a decoding timestamp (decoding time) are supplied in the NTP short time format. The value "0x03" indicates that a presentation timestamp is supplied in 90-KHz precision. The value "0x04" indicates that a presentation timestamp and a decoding timestamp are supplied in 90-KHz precision.

A "payload_header_extension_length," which is a 16-bit field, indicates the size of the MMT payload_header_extension. A "presentation_timestamp," which is a 32-bit field, indicates the value of a presentation timestamp (presentation time). A "decoding_timestamp," which is a 32-bit field, indicates the value of a decoding timestamp (decoding time).

Next, the case where time information is transmitted for each access unit (AU) which is a fragment in an MPU payload will be further described. In this case, for example, as shown in FIG. 27, presentation time (presentation timestamp) PTS and an offset value DLT are inserted and transmitted in the MFU header extension (mfu_header_extension) area for each access unit (AU). Although not shown, decoding time (decoding timestamp) DTS may be delivered instead of the presentation time (presentation timestamp) PTS.

FIG. 28 shows an example structure (syntax) of an MFU. The MFU contains an MFU header (mfu_header( )) and MFU media data (mfu_media_data( )). FIG. 29 and FIG. 30 show an example structure (syntax) of the MFU header (mfu_header( )). FIG. 31 shows semantics of major information of this example structure.

A "sequence_number," which is a 32-bit field, is an MFU sequence number in an MPU. A "trackref_index," which is an 8-bit field, is a media track number. A "sample_number," which is a 32-bit field, indicates the ordinal number of a sample (access unit) to which the MFU belongs in the box moof. A "priority," which is an 8-bit field, shows the level of priority of the MFU in the MPU. A "dependency_counter," which is an 8-bit field, indicates the number of MFUs on which decoding depends in the MFU.

An "offset," which is a 16-bit field, indicates an offset from the box mdat. A "length," which is a 32-bit field, indicates the size of an MFU. A "multiLayer_flag," which is a 1-bit field, indicates the presence or absence of multilayer information. A "mfu_header_extension_flag," which is a 1-bit field, indicates the presence or absence of an MFU extension (mfu_extension).

A "dependency_id," "depth_flag," "temporal_id," "quality_id," "priority_id," "view_id," and "layer_id" indicate IDs that indicate various dependence relationships between MFUs. An "Item_ID" indicates the ID of a file. If the MFU header extension flag (mfu_header_extension_flag) is "1," the MFU header extension (mfu_header_extension( )) is present.

FIG. 32 shows an example structure (syntax) of the MFU header extension (mfu_header_extension( )). FIG. 33 shows semantics of major information of this example structure. An "asset_type," which is a 2-bit field, indicates an asset type. For example, "01" indicates video, and "10" indicates audio.

A "time_tick," which is a 2-bit field, indicates what clock is used for control. The value "01" indicates that all is controlled using a clock of 90-kHz precision. The value "10" indicates the "NTP short time." An "au_rate_scale," which is a 10-bit field, indicates scale information for calculating the rate of video or audio access units.

If the asset type is video, "000" indicates a value of 3750, and the rate can be calculated from that value to be 24 Hz. Also, "001" indicates a value of 3600, and the rate can be calculated from that value to be 25 Hz. Also, "010" indicates a value of 3000, and the rate can be calculated from that value to be 30 Hz.

Also, "011" indicates a value of 1800, and the rate can be calculated from that value to be 50 Hz. Also, "100" indicates a value of 1500, and the rate can be calculated from that value to be 60 Hz. Also, "101" indicates a value of 900, and the rate can be calculated from that value to be 100 Hz. Also, "110" indicates a value of 750, and the rate can be calculated from that value to be 120 Hz. Note that "111" is reserved.

On the other hand, if the asset type is audio, "000" indicates a value of 1920, and the rate can be calculated from that value to be 48 KHz*1024. Also, "001" indicates a value of 2089.8, and the rate can be calculated from that value to be 44.1 KHz*1024. Also, "010" indicates a value of 2880, and the rate can be calculated from that value to be 32 KHz*1024. Note that the others are reserved.

A "division_factor," which is a 2-bit field, is a factor for finely adjusting the rate. If the asset type is video, "00" indicates 1, and "01" indicates 1.001. Also, if the asset type is audio, "00" indicates 1, and "01" indicates 2.

A "timestamp_for_processing," which is a 32-bit field, indicates time of a corresponding access unit. In this case, if the "time_tick" is "01," the timestamp is in 90-KHz precision. Also, if the "time_tick" is "10," the timestap is the "NIP short timestamp" defined in RFC5059.

A "timestamp_type," which is a 1-bit field, indicates whether the time indicated by the above "timestamp_for_processing" is decoding time or presentation time. The value "1" indicates that the time is decoding time (decode_timestamp), and the value "0" indicates that the time is presentation time (display_timestamp). The "delta_fixed_length_code," which is an 8-bit field, is an area where an offset value having an 8-bit fixed length is inserted.

Note that, in the foregoing, an example structure in which time information (e.g., the presentation time PTS or the decoding time DTS, and the offset value DLT) is inserted in the MFU header extension, has been illustrated. There may be an example structure in which time information is inserted in the MFU payload. FIG. 34 and FIG. 35 show an example structure (syntax) of the MFU header (mfu_header( )) in that case. FIG. 36 shows semantics of major information of this example structure.

A "timestamp_type," which is a 2-bit field, indicates whether or not a timestamp is supplied to the head of the MPU payload. The value "00" indicates that a timestamp is not supplied. In this case, the first byte (1st byte) of the MPU payload is equal to the head byte of the fragmented MPU payload. The value "01" indicates that a presentation timestamp is supplied to the head of the MPU payload. In this case, the head byte of the fragmented MPU payload is supplied immediately after the presentation timestamp. The value "10" indicates that both a decoding timestamp and a presentation timestamp are supplied to the head of the MFU payload. In this case, the head byte of the fragmented MPU payload is supplied immediately after the timestamps.

A "time_tick," which is a 1-bit field, indicates the precision of the value of a timestamp. The value "0" indicates that the timestamp is in 90000-Hz precision. The value "1" indicates that the timestamp is in the NTP short time format.

FIG. 37 shows an example structure (syntax) of the MFU payload (mfu_payload( )), and semantics of the major information. A "presentation_timestamp," which is a 32-bit field, indicates the value of a presentation timestamp (presentation time). A "decoding_timestamp," which is a 32-bit field, indicates the value of a decoding timestamp (decoding time). If the "timestamp_type" in the MFU header is "01," the "presentation_timestamp," which is a 32-bit field, is present immediately before the payload data (payload_data). Also, if the "timestamp_type" in the MFU header is "10," the "presentation_timestamp," which is a 32-bit field, and the "decoding_timestamp," which is a 32-bit field, are present immediately before the payload data (payload_data).

FIG. 38 and FIG. 39 shows another example structure (syntax) of the MFU header (mfu_header( )) in a case where time information is inserted in the MFU payload. FIG. 40 shows semantics of major information of this example structure. A "payload_header_flag," which is 1-bit flag information, indicates whether or not an MFU payload header is present at the head of the MFU payload. The value "0" indicates that an MFU payload header is not present. In this case, the first byte (1st byte) of the MFU payload is equal to the head byte of the fragmented MPU payload. The value "1" indicates that an MFU payload header is present. In this case, the head byte of the fragmented MPU payload is supplied immediately after the MFU payload header.

FIG. 41 shows an example structure (syntax) of the MFU payload (mfu_payload( )). FIG. 42 shows semantics of major information of this example structure. An "mfu_payload_header_type," which is an 8-bit field, indicates the type of the MFU payload header. For example, "0x01" indicates that a presentation timestamp (presentation time) is supplied in the NTP short time format. The value "0x02" indicates that a presentation timestamp and a decoding timestamp (decoding time) are supplied in the NTP short time format. The value "0x03" indicates that a presentation timestamp is supplied in 90-KHz precision. The value "0x04" indicates that a presentation timestamp and a decoding timestamp are supplied in 90-KHz precision.

An "mfu_payload_header_length," which is an 8-bit field, indicates the size of the MFU payload header immediately after this element in the number of bytes. A "presentation_timestamp," which is a 32-bit field, indicates the value of a presentation timestamp (presentation time). A "decoding_timestamp," which is a 32-bit field, indicates the value of a decoding timestamp (decoding time).

Next, the case where time information is transmitted in a message will be further described. FIG. 43 shows an example structure (syntax) of a timestamp message. The timestamp message is a message for supplying time information of a receiver in order to allow the receiver to obtain the decoding time (decode_timestamp) and presentation time (display_timestamp) of each access unit (AU) contained in an MPU.

The timestamp message contains a timestamp table (timestamp_table( )) in which contents of a message are provided. FIG. 44 shows an example structure (syntax) of the timestamp table (timestamp_table( )). Although not described in detail, the timestamp table contains information (time information, conversion information) similar to the above MMT payload_header_extension (mmtp_payload_header_extension( )) (see FIG. 23 and FIG. 24).

The timestamp message contains a packet ID (acket_ID), and is related at the asset level. In addition, the timestamp message additionally contains information, such as a table ID (table_id), version, length, and the like, according to a conventional table configuration. Here, the table ID or version assigned is unique to the system. Also, the length indicates the size of the entire table.

The timestamp table (timestamp_table) is a message that is a bundle of messages. The timestamp table can be delivered in a message payload (message payload( )) in a package access message. FIG. 45 shows an example structure (syntax) of the package access message.

In this case, as shown in the drawing, the package access message begins with a "message_id" indicating the package access message in the header portion, followed by the "version" and the "length." Following this, a "number_of_tables" indicates the number of tables, and there are as many loops as there are tables. Each loop begins with a "table_id," followed by a "table version" and a "table_length." The "table_id" matches the "table_id" in the timestamp table (timestamp_table). The "table_length" contains the "timestamp_table," and indicates a size including another "table." Thereafter, the "timestamp_table" is directly supplied in the "message_payload."

[Variable Length Coding of Offset Value]

Next, variable length coding of the offset value DLT(n) will be described. As described above, in order to allow a receiver to reproduce the decoding time and presentation time of each access unit (AU), the offset value of each access unit is delivered in a time-series manner. The offset value is effective when a sequence in the order of transmission (=the order of decoding) is rearranged to the order of presentation. The offset value is mainly referenced in order to correctly perform picture reordering for video and ensure synchronous presentation.

FIG. 46 shows an example correspondence relationship between the decoding time D(n) and presentation time R(n) of an access unit AU(n). In the case of this example, a reorder distance M=3, and the following values, which are as many as there are access units, are encoded.

The offset value DLT of D(0)→R(0)=+1
The offset value DLT of D(1)→R(1)=+3
The offset value DLT of D(2)→R(2)=0
The offset value DLT of D(3)→R(3)=0

Therefore, the time-series representation of the offset values DLT is +1, +3, 0, 0, +3, 0, 0, 3, . . . . This depends on the reorder distance M. As the reorder distance M increases, the proportion of "0" inserted increases. In this embodiment, by utilizing this, an effective code size is ensured, depending on the probability of occurrence of 0, and variable length coding is performed in order to match the transmission capacity.

FIG. 47 shows an example variable length code table for performing variable length coding on a time series of offset values. A short word is assigned to "0" that occurs with high probability, and a long word is assigned to a value that occurs in units of the reorder distance M. Such variable length coding can efficiently reduce the transmission capacity of a time series of offset values.

Note that the proportion of B pictures increases with an increase in the reorder distance M, and therefore, the above reduction efficiency of transmission capacity due to variable length coding increases. This is shown in FIG. 48. For example, if the reorder distance M is 3, the transmission capacity of the offset values of four access units "IPBB" is 10 bits, and the average is 10/4 bits. In contrast to this, for example, if the reorder distance M is 6, the transmission capacity of the offset values of four access units "IPBBBBB" is 13 bits, and the average is 13/7 bits.

As described above, in the transmission/reception system 10 shown in FIG. 1, time information for allowing a receiver to obtain the decoding time and/or presentation time of each access unit is inserted in an MMT packet that is transmitted from the transmission apparatus 100 to the reception apparatus 200. Therefore, for example, the time information for allowing a receiver to obtain decoding time and/or presentation time can be satisfactorily delivered.

Also, in the transmission/reception system 10 shown in FIG. 1, time information is, for example, the value (initial value) of decoding time or presentation time corresponding to the initial access unit of one or more access units, and an offset value from decoding time to presentation time each of which corresponds to each access unit. Also, this offset value is a relative offset value, but not an absolute offset value. Therefore, the time information can be efficiently delivered.

Also, in the transmission/reception system 10 shown in FIG. 1, a time series of offsets are subjected to variable length coding before being delivered. Therefore, the transmission capacity of time information can be reduced.

2. Variations

Note that, in the above embodiments, a method has been described in which time information in a file is included in an MMT packet. Alternatively, time information in "moov" or "moof" may be supplied directly in an area in an MMT payload header or MFU, or a message, which provides a similar advantage.

Also, in the above embodiments, the present technology is applied to the transmission/reception system 10 in which a transport stream containing transport packets having the MMT structure, i.e., MMT packets, is delivered through an RF transmission channel or a communication network transmission channel. The present technology is, of course, also similarly applicable to transmission/reception systems in which a similar transport stream is delivered through an RF transmission channel or a communication network transmission channel.

Additionally, the present technology may also be configured as below.

(1)

A transmission apparatus including:
a transport stream generation unit configured to generate a transport stream in which a first transport packet containing transport media in a payload and a second transport packet containing information about the transport media in a payload, are time-division multiplexed;
a transport stream transmission unit configured to transmit the transport stream to a receiver through a predetermined transmission channel; and
a time information insertion unit configured to insert time information for allowing the receiver to obtain decoding time and/or presentation time into the first transport packet or the second transport packet.

(2)

The transmission apparatus according to (1),
wherein the transport media contained in the first transport packet includes one or more access units, and
wherein the time information inserted by the time information insertion unit is information for obtaining decoding time and/or presentation time corresponding to each of the one or more access units.

(3)

The transmission apparatus according to (2),
wherein the time information inserted by the time information insertion unit has a value of decoding time or presentation time corresponding to the initial access unit of the one or more access units, and an offset value from decoding time to presentation time each corresponding to each access unit.

(4)

The transmission apparatus according to (3),
wherein the offset value is a relative offset value corresponding to an absolute offset value, and
wherein conversion information for converting the relative offset value into the absolute offset value is added to the time information inserted by the time information insertion unit.

(5)

The transmission apparatus according to (4),
wherein the time information insertion unit inserts the relative offset value after variable length coding.

(6)

The transmission apparatus according to (2),
wherein the time information inserted by the time information insertion unit is presentation time, or presentation time and decoding time, corresponding to each of the one or more access units.

(7)

The transmission apparatus according to any one of (1) to (6),
wherein the payload of the first transport packet includes a payload header portion and a payload body portion, and
wherein the time information insertion unit inserts the time information into the payload header portion.

(8)

The transmission apparatus according to any one of (1) to (6),
wherein the payload of the first transport packet includes a payload header portion and a payload body portion,
wherein, in the payload body portion, fragment payloads each containing one or more access units obtained by fragmenting the transport media, are provided together with fragment headers, and
wherein the time information insertion unit inserts, into the fragment header, time information of the corresponding access unit.

(9)

The transmission apparatus according to any one of (1) to (6),
wherein the payload of the first transport packet includes a payload header portion and a payload body portion,
wherein, in the payload body portion, fragment payloads each containing one or more access units obtained by fragmenting the transport media, are provided together with fragment headers, and
wherein the time information insertion unit inserts, into the fragment payload, time information of the corresponding access unit.

(10)

The transmission apparatus according to any one of (1) to (6),
wherein the payload of the second transport packet includes a payload header portion and a payload body portion, and
wherein the time information insertion unit inserts the time information into the payload body portion.

(11)

The transmission apparatus according to any one of (1) to (10),
wherein the predetermined transmission channel is an RF transmission channel or a communication network transmission channel.

(12)

The transmission apparatus according to any one of (1) to (11),
wherein the first transport packet and the second transport packet are MMT packets.

(13)

A transmission method including:
a transport stream generation step of generating a transport stream in which a first transport packet containing transport media in a payload and a second transport packet containing information about the transport media in a payload, are time-division multiplexed;
a transport stream transmission step of transmitting the transport stream to a receiver through a predetermined transmission channel; and
a time information insertion step of inserting time information for allowing the receiver to obtain decoding time and/or presentation time into the first transport packet or the second transport packet.

(14)

A reception apparatus including:
a transport stream reception unit configured to receive a transport stream in which a first transport packet containing transport media in a payload and a second transport packet containing information about the transport media in a payload, are time-division multiplexed, from a transmitter through a predetermined transmission channel,
wherein time information for obtaining decoding time and/or presentation time is inserted in the first transport packet or the second transport packet, and
wherein the reception apparatus further includes a transport media processing unit configured to process the transport media extracted from the transport stream using the decoding time and/or presentation time obtained based on the time information.

(15)

The reception apparatus according to (14),
wherein the transport media contained in the first transport packet includes one or more access units,
wherein the time information is a value of decoding time or presentation time corresponding to an initial access unit of the one or more access units, and a relative offset value corresponding to an absolute offset value from decoding time to presentation time each corresponding to each access unit, and
wherein the reception apparatus further includes an offset value conversion unit configured to convert the relative offset value into the absolute offset value.

(16)

A reception method including:
a transport stream reception step of receiving a transport stream in which a first transport packet containing transport media in a payload and a second transport packet containing information about the transport media in a payload, are time-division multiplexed, from a transmitter through a predetermined transmission channel,
wherein time information for obtaining decoding time and/or presentation time is inserted in the first transport packet or the second transport packet, and
wherein the reception method further includes a transport media processing step of processing the transport media extracted from the transport stream using the decoding time and/or presentation time obtained based on the time information.

A major feature of the present technology is that the value of decoding time or presentation time corresponding to the initial access unit of a plurality of access units, and a relative offset value from decoding time to presentation time each of which corresponds to each access unit, are inserted in an MMT packet, whereby time information can be efficiently delivered (see FIG. 15 and FIG. 18).

REFERENCE SIGNS LIST 10 transmission/reception system
100 transport packet transmission apparatus
101 asset generation unit
102 encoder
103 transport packetization unit
104 clock generation unit
105 IP transmission unit
106 RF transmission unit
200 transport packet reception apparatus
201 RF reception unit
202 IP reception unit
203 clock generation unit
204 transport unpacketization unit
205 decoding/output process unit
301 demultiplexer
302 video decoder
303 video display unit
304 audio decoder
305 audio output unit
306 control unit

The invention claimed is:

1. A transmission apparatus comprising: circuitry configured to generate a transport stream in which a first transport packet and a second transport packet are time-division multiplexed, the first transport packet including a first type identifier and a first payload body carrying media data, and the second transport packet including a second type identifier and a second payload body carrying control information related to the media data;
insert a value of a display time of the media data included in the first payload body of the first transport packet into the control information included in the second payload body of the second transport packet; and output the transport stream for transmission through a transmission path, wherein the first type identifier indicates that the first payload body of the first transport packet is carrying data of a media asset type, the second type identifier indicates that the second payload body of the second transport packet is carrying data of a control message type, the second transport packet includes a header portion and a payload portion, the header portion of the second transport packet includes a packet identifier identifying a control message with which the control information is associated, the payload portion of the second transport packet includes a payload header and the second payload body, and the second type identifier is included in the payload header of the payload portion of the second transport packet.

2. The transmission apparatus according to claim 1, wherein the media data included in the first transport packet is configured from one or more access units, and the circuitry is configured to insert a value of a display time corresponding to a first access unit of the one or more access units as the value of the display time of the media data.

3. The transmission apparatus according to claim 2, wherein the circuitry is configured to insert an offset value from a decoding time to the display time corresponding to each of the access units.

4. The transmission apparatus according to claim 3, wherein the offset value is a relative offset value corresponding to an absolute offset value, and the circuitry is configured to insert conversion information for converting the relative offset value into the absolute offset value.

5. The transmission apparatus according to claim 4, wherein the circuitry is configured to insert the relative offset value after performing variable-length encoding of the relative offset value.

6. The transmission apparatus according to claim 1, wherein the transmission path is a radio frequency (RF) transmission path or a communication network transmission path.

7. The transmission apparatus according to claim 1, wherein the first transport packet and the second transport packet are MPEG Media Transport (MMT) packets.

8. A transmission method comprising:

generating, using circuitry, a transport stream in which a first transport packet and a second transport packet are time-division multiplexed, the first transport packet including a first type identifier and a first payload body carrying media data, and the second transport packet including a second type identifier and a second payload body carrying control information related to the media data;

inserting a value of a display time of the media data included in the first payload body of the first transport packet into the control information included in the second payload body of the second transport packet; and outputting the transport stream for transmission through a transmission path, wherein the first type identifier indicates that the first payload body of the first transport packet is carrying data of a media asset type, the second type identifier indicates that the second payload body of the second transport packet is carrying data of a control message type, the second transport packet includes a header portion and a payload portion, the header portion of the second transport packet includes a packet identifier identifying a control message with which the control information is associated, the payload portion of the second transport packet includes a payload header and the second payload body, and the second type identifier is included in the payload header of the payload portion of the second transport packet.

9. A non-transitory computer readable medium including executable instructions, which when executed by a computer cause the computer to:

generate a transport stream in which a first transport packet and a second transport packet are time-division multiplexed, the first transport packet including a first type identifier and a first payload body carrying media data, and the second transport packet including a second type identifier and a second payload body carrying control information related to the media data;

insert a value of a display time of the media data included in the first payload body of the first transport packet into the control information included in the second payload body of the second transport packet; and output the transport stream for transmission through a transmission path, wherein the first type identifier indicates that the first payload body of the first transport packet is carrying data of a media asset type, the second type identifier indicates that the second payload body of the second transport packet is carrying data of a control message type, the second transport packet includes a header portion and a payload portion, the header portion of the second transport packet includes a packet identifier identifying a control message with which the control information is associated, the payload portion of the second transport packet includes a payload header and the second payload body, and the second type identifier is included in the payload header of the payload portion of the second transport packet.

10. The transmission apparatus according to claim 1, wherein the media data corresponds to at least a portion of a mdat box of a MPEG Media Transport (MMT) file, and the control information corresponds to one or more metadata boxes of the MMT file.

* * * * *